United States Patent [19]
Dornbush et al.

[11] Patent Number: 5,839,356
[45] Date of Patent: Nov. 24, 1998

[54] AUTOMATIC BREAD MAKING MACHINE

[75] Inventors: David A. Dornbush, Prior Lake; Neal P. Barnes, Maple Grove; Michael A. Fritz, Shorewood; Troy M. Iverson, Chaska; Michael F. Meyer, Ramsey; Kevin B. Moore, Chaska; Jeffrey E. Sandahl, Howard Lake; Jeffrey S. Duncan, Burnsville, all of Minn.

[73] Assignee: American Harvest, Inc., Chaska, Minn.

[21] Appl. No.: 298,458

[22] Filed: Aug. 30, 1994

Related U.S. Application Data

[63] Continuation-in-part of Ser. No. 297,603, Aug. 29, 1994, abandoned, which is a continuation-in-part of Ser. No. 25,919, Jul. 15, 1994, Pat. No. Des. 367,397.

[51] Int. Cl.⁶ ..................................................... A47J 27/00
[52] U.S. Cl. .................................. 99/331; 99/348; 99/341
[58] Field of Search .............................. 99/348, 331, 468, 99/341, 385, 389; 366/98, 145

[56] References Cited

U.S. PATENT DOCUMENTS

| | | | |
|---|---|---|---|
| D. 169,373 | 4/1953 | Iannelli . | |
| D. 311,848 | 11/1990 | Mikami et al. | D7/348 |
| D. 325,147 | 4/1992 | Watanabe et al. | D7/354 |
| 2,478,253 | 8/1949 | Doner . | |
| 3,615,680 | 10/1971 | Henika et al. . | |
| 3,746,317 | 7/1973 | Schroeder, Sr. . | |
| 4,159,879 | 7/1979 | Coucher | 366/98 |
| 4,188,867 | 2/1980 | DeRemer | 99/385 |
| 4,202,257 | 5/1980 | Masuda et al. | 99/348 |
| 4,294,166 | 10/1981 | Takeuchi | 99/348 |
| 4,413,173 | 11/1983 | Grove et al. | 99/389 |
| 4,762,057 | 8/1988 | Hirota et al. | 99/348 |
| 4,776,265 | 10/1988 | Ojima | 99/348 |
| 4,844,048 | 7/1989 | Aruga et al. | 126/21 R |
| 4,870,896 | 10/1989 | Asahina et al. | 99/348 |
| 4,885,176 | 12/1989 | Nakakura et al. | 426/19 |
| 4,903,587 | 2/1990 | Nagasaka et al. | 99/325 |
| 4,903,588 | 2/1990 | Horiuchi et al. | 99/348 |
| 4,903,589 | 2/1990 | Aoyama | 99/348 |
| 4,930,899 | 6/1990 | Aoyama | 99/348 |
| 4,951,559 | 8/1990 | Arao et al. | 99/348 |
| 4,957,040 | 9/1990 | Nakakura et al. | 99/348 |
| 4,977,822 | 12/1990 | Seo et al. | 99/348 |
| 4,984,512 | 1/1991 | Takahashi et al. | 99/327 |
| 5,013,158 | 5/1991 | Tarlow | 99/348 |
| 5,076,153 | 12/1991 | Takahashi et al. | 99/327 |
| 5,463,936 | 11/1995 | Clark et al. | 99/327 |
| 5,463,937 | 11/1995 | Belongia et al. | 99/348 |

FOREIGN PATENT DOCUMENTS

| | | |
|---|---|---|
| 1310616 | 12/1989 | Japan . |
| 2013419 | 1/1990 | Japan . |

OTHER PUBLICATIONS

"You add the ingredients . . . Hitachi® does the work while you sleep!" *Solutions—Products that make life easier®*, Catalog, Late Autumn, 1993, 2 pages.

The Bread Oven Recipe Booklet, Models ABM300, ABM350, Value Specialty Services, Inc., Owner's Manual, 17 pages.

Panasonic® Bread Bakery®—specifications SD–BT56P (2 pages).

Toastmaster 1154 Bread Box™ Breadmaker specification (1 page).

Sanyo SBM–15 The Bread Factory Plus™ specifications (4 pages).

(List continued on next page.)

*Primary Examiner*—Reginald L. Alexander
*Attorney, Agent, or Firm*—Godfrey & Kahn, S.C.

[57] ABSTRACT

A front-loading bread making machines for making two loaves of bread simultaneously. The bread maker utilizes bread pans with a pseudo-overrise which emulate the shape of conventional bread and facilitates handling of the bread pans. The bread pans have a high pan surface area to opening ratio which decreases rise and bake time.

19 Claims, 26 Drawing Sheets

OTHER PUBLICATIONS

Sanyo Small Appliances, SBM–12 and SBM–11 Bread Factory Plus Automatic Breadmaker, (7 pages).

"Price and Performance Comparisons of Leading Heavy Duty Kitchen Machines," Features comparison, K Tec Elite, 1 page.

Betty Crocker® 1994 Kitchen Appliances, Bake–It–Easy® and Bake–It Easy 2®, 4 pages.

DAK, Auto Bakery and Turbo Baker II, "Loafing It," *1992 Guide to Automatic Bread Making,* 7 pages.

Automatic Home Bakery Cook Book, HB–B101, Hitachi, 9 pages.

"Limiting Price Erosion, Returns Key as New Players Hit Breadmaker Market," Peter Gianetti, editor, *HomeWorld Business,* pp. 14–20, Aug. 30–Sep. 12, 1993.

The Bread Oven, Models ABM300–1, ABM350–1, Value Specialty Services, Inc., Owner's Manual, 17 pp. 1–14.

"Bread Master" Automatic Home Bakery Cookbook, Model HB–B301, 4 pages.

"Breadmakers—For a lot of dough, a machine to meet your kneads?" *Consumer Reports,* pp. 688–689, Nov., 1988.

PCT/JP88/00515, WO 88/09640 Bread Making Machine Dec. 1988.

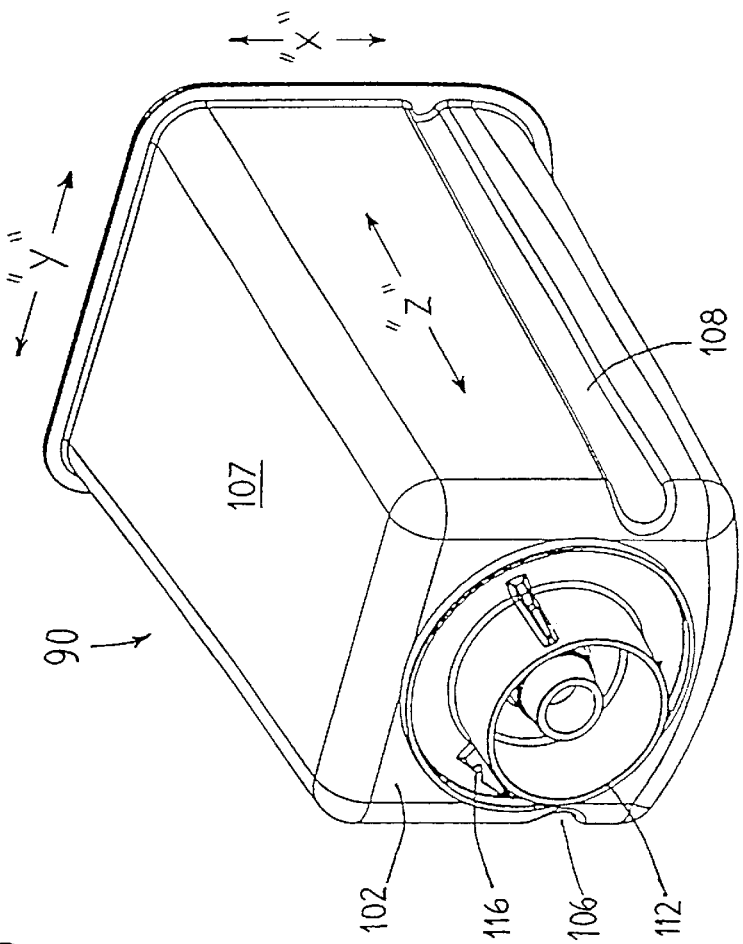
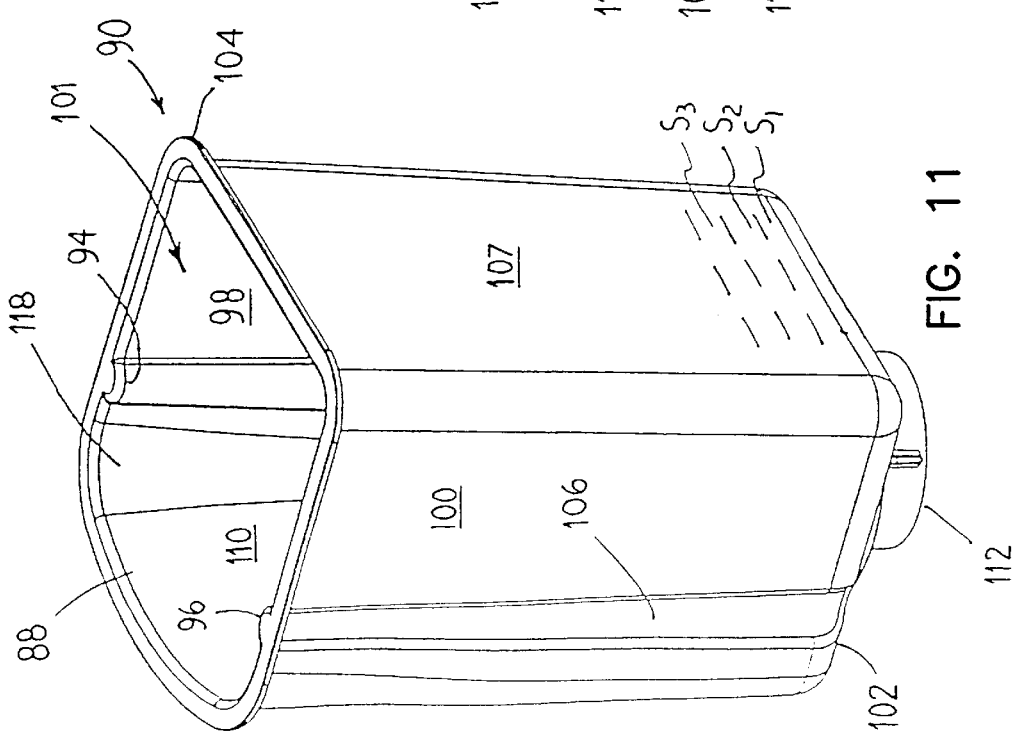
FIG. 12
FIG. 11

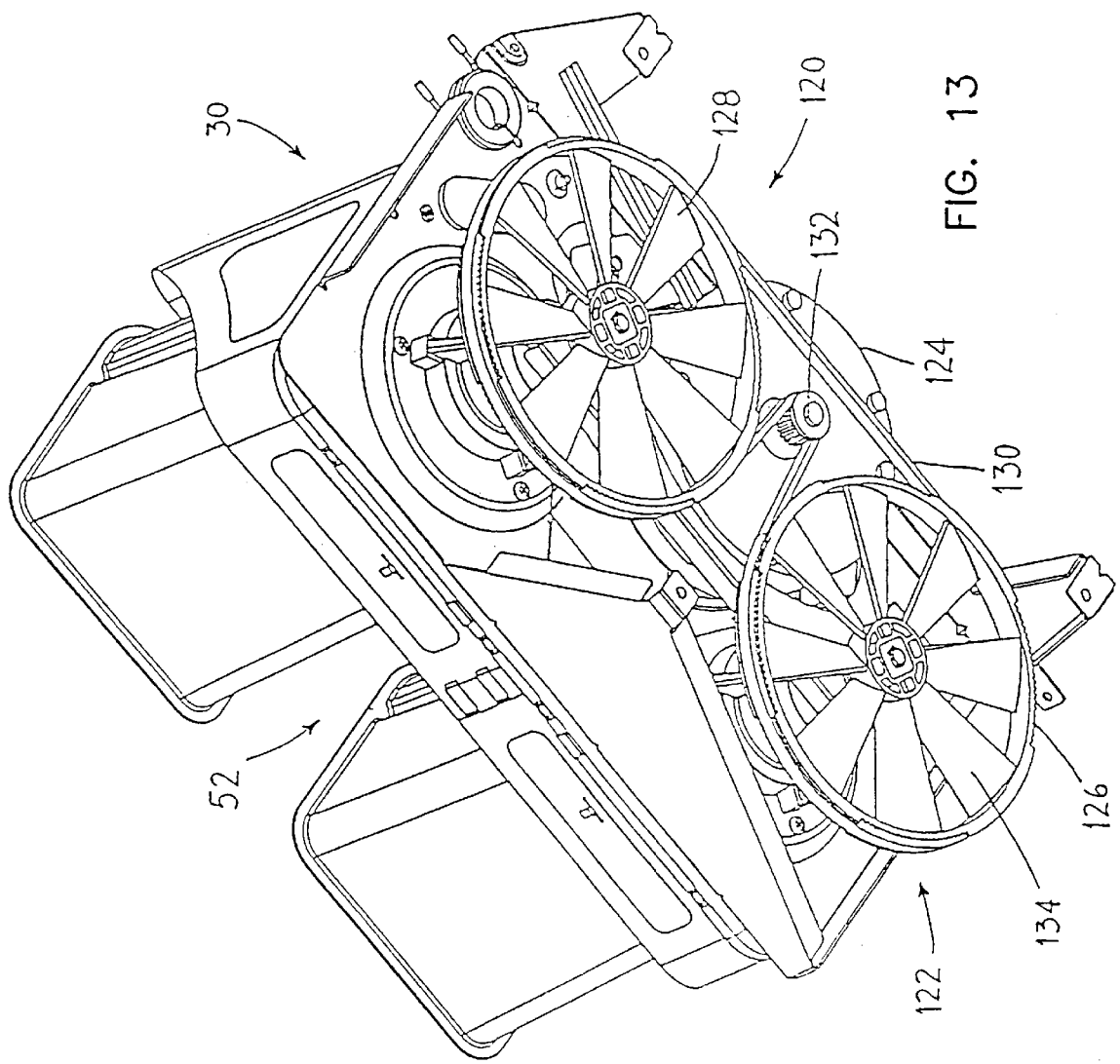

| BREAD TYPE | TOTAL TIME | | 1ST KNEAD | REST | 2ND KNEAD | 1ST RISE | PUNCH DOWN | 2ND RISE | BAKE |
|---|---|---|---|---|---|---|---|---|---|
| WHITE | 2:15 | PERIOD LENGTH<br>TIME REMAINING | 7 MIN<br>2:15 | 5 MIN<br>2:08 | 24 MIN<br>2:03 | 27 MIN<br>1:39 | 3 MIN<br>1:12 | 29 MIN<br>1:09 | 40 MIN<br>0:40 |
| WHEAT | 3:10 | PERIOD LENGTH<br>TIME REMAINING | 7 MIN<br>3:10 | 10 MIN<br>3:03 | 33 MIN<br>2:53 | 50 MIN<br>2:20 | 3 MIN<br>1:30 | 47 MIN<br>1:27 | 40 MIN<br>0:40 |
| SWEET | 2:40 | PERIOD LENGTH<br>TIME REMAINING | 7 MIN<br>2:40 | 5 MIN<br>2:33 | 24 MIN*<br>2:28 | 42 MIN<br>2:04 | 3 MIN<br>1:22 | 39 MIN<br>1:19 | 40 MIN<br>0:40 |
| RAPID | 2:00 | PERIOD LENGTH<br>TIME REMAINING | 7 MIN<br>2:00 | 5 MIN<br>1:53 | 24 MIN<br>1:48 | 44 MIN<br>1:24 | 0 MIN | 0 MIN | 40 MIN<br>0:40 |
| DOUGH | 1:20 | PERIOD LENGTH<br>TIME REMAINING | 7 MIN<br>1:20 | 5 MIN<br>1:13 | 24 MIN<br>1:08 | 44 MIN<br>0:44 | 0 MIN | 0 MIN | 0 MIN |

FIG. 16

AUTOMATIC BREAD MAKING MACHINE

This is a Continuation-in-Part of Application Ser. No. 08/297,603, filed Aug. 29, 1994, now abandoned, which is a Continuation-in-Part of design Application Ser. No. 29/025,919 entitled "BREADMAKER" filed on Jul. 15, 1994 now U.S. Pat. No. Des. 367,397.

A portion of the disclosure of this patent document contains material which is subject to copyright protection. The copyright owner has no objection to the facsimile reproduction by any one of the patent disclosure, as it appears in the Patent and Trademark Office files or records, but otherwise reserves all copyrights whatsoever.

Background of the Invention

1. Field of the Invention

The present invention pertains to the field of automatic bread making machines, and in particular to bread makers adapted for use in the home. The present invention also relates to an improved bread pan for use in an automatic bread machine.

2. Description of the Related Art

Automatic bread making machines for use in the home have gained a degree of popularity because of their promise of fresh-baked, wholesome bread which is easily and conveniently made when desired. Ideally, an automatic home bread making machine is easy to operate and requires less time and effort than making bread by hand. Since the difficult bread making steps are done automatically by the machine, the resulting bread tends to be uniform, and much less dependent on skill and training than manual bread making. Wholesomeness of the bread may be improved as compared to commercially produced product, not only because of freshness at time of consumption, but also because the user has at least some control over the quality of ingredients used.

To date, automatic bread making machines, despite their popularity, have only partially fulfilled their promises of convenience, speed and quality of product. In the area of convenience, for example, there are a number of problems to consider. In many situations, the size of the bread loaf made by existing machines is not large enough to feed the desired number of people. Moreover, because the bread making cycle is relatively long, it is difficult and time consuming to make two loaves in succession. Attempts to make a larger bread pan have led to longer baking times and an uneven product. Likewise, attempts to shorten baking times with higher temperatures have proved unsuccessful, and have led to over-browning and uneven baking.

Other problems arise from the size, shape, and operational configuration of existing bread making machines. These machines often have a large counter top footprint, and use a top-loading "washing machine design" that requires the ingredients and finished bread to be loaded and unloaded from the top. These machines can not therefore be loaded or unloaded when positioned under an overhead cabinet. Consequently, existing bread makers, at least while in use, take up a considerable amount of space, which is at a premium in a typical kitchen. Also, the process of loading and unloading the bread pan through the top opening is awkward and can lead to dropping or spilling. Spilled ingredients may bake onto internal surfaces of the bread machine and can be extremely difficult to clean. In case of accidental overfill of ingredients, the bread will rise over the top of the bread pan, and can enter and clog an air vent in the lid of many machines. It is difficult to clean dough from inside the vent passage, especially once the bake cycle has been completed.

Another difficulty is presented by the controls for existing bread making machines. The advent of multiple bread making programs, or variable settings for the bread cycles, has created the need for a simple user interface. Unfortunately, poorly implemented user controls have in many cases created confusing and difficult to remember setting sequences, increasing the risk for mistake or error.

Apart from and in addition to the above-noted inconveniences with existing bread machines are certain disadvantages with the bread produced by the machines. The shape of a loaf produced by the machines is not at all like the familiar conventionally-baked commercial bread loaf. Often, the loaves have odd, cubic shapes which are difficult to cut into usable slices, and the resulting slices do not resemble ordinary bread. The unusual shape of the bread from many prior art bread makers not only is aesthetically unsatisfactory, but it also has functional disadvantages. Many products and accessories used in the home are designed around the shape and size of a standard slice of bread. The products ranges from the cut of lunch meat, to the size of sandwich bags and containers, to the design of toasters. We believe that the odd shape of bread from the bread pans of existing bread making machines is a factor which has hurt the general acceptance of bread machines.

The net result of these inconveniences, taken together, detract from the convenience potential of the home bread making machine.

SUMMARY OF THE INVENTION

The present invention relates to a front-loading automatic bread maker for producing bread from bread ingredients. The front-loading bread maker can be configured to make two loaves of bread simultaneously. The two bread pans preferably are laterally arranged in the bread maker.

The front-loading automatic bread maker is ideal for producing bread in a height restricted space, such as under an overhead cabinet since the front-loading structure permits generally horizontal insertion and extraction of the bread pans from the mixing and cooking chamber. A transparent cover permits monitoring of the bread making cycles.

The front loading bread maker has a plurality of side walls including at least a front wall and a top wall. An opening extending across at least a portion of the front and top walls is provided to permit insertion and extraction of a bread pan substantially from the front wall of the housing. A cover movable between a closed position for substantially enclosing the opening and an open position generally horizontally off-set from the front wall of the housing is provided. The bread maker for making two loaves simultaneously preferably has a bottom panel defining an area of less than 160 square inches.

The cover preferably is hinged to the housing proximate the lower portion of the front surface. The cover preferably is constructed from a transparent, high temperature thermoplastic. The thermoplastic has non-stick characteristics which are desirable. In an alternate embodiment, the housing has left and right sides, and the opening extends substantially from the left side to the right side.

The bread maker includes at least one bread pan releasably retained in a mixing and cooking chamber for receiving the bread ingredients. The bread pan has a kneading blade disposed therein for kneading the bread ingredients. A motor operatively connected to the kneading blade is provided for kneading the bread ingredients. A heating element in the mixing and cooking chamber is provided for baking the bread ingredients. The kneading blade is operatively connected to a fan pulley with air circulating blades for circulating air proximate the motor.

A control mechanism is provided for controlling the operation of the motor and heating element according to a bread making cycle. A user interface operatively connected to the control mechanism is provided. The user interface preferably is attached to the housing proximate the lower portion of the front surface. The user interface includes a digital display, at least one button for activating at least one programming mode, and a rotating input device for modifying individual parameters in a program mode. The programming modes may include bread type, crust color and finish time, as well as other functions.

A dough cycle is included so that the present bread maker can be used as a dough maker. A bake only cycle is also included so that non-standard bake times can be programmed into the bread maker. The dough cycle and bake only cycle can also be used in combination to customize the bread making cycles.

A retaining mechanism is located in the mixing and cooking chamber for retaining the bread pan during the bread making cycle. The retaining mechanism allows for generally vertical engagement and disengagement with the bread pan.

Another aspect of the present invention is to provide an improved bread pan which makes bread of more conventional slice shape and size. The high pan surface area-to-pan opening ratio of the present bread pans provides a number of advantages, including shorter rise and bake times, more efficient use of yeast, and a bread density that varies from slice to slice, rather than within an individual slice. The ratio of the bread pan surface area to the surface area or cross sectional area of the opening is greater than 6.5, and preferably greater than 7.0.

A preferred bread pan includes a plurality of connected sidewalls and a top opening. The end wall has a bread maker engaging structure. A bowed sidewall has an outward bow along a longitudinal axis. A pair of opposing side walls are provided generally parallel to the longitudinal axis. Each of the opposing side walls has opposing internal ribs proximate the bowed sidewall. The ribs extending substantially the length of the opposing side walls and generally parallel to the longitudinal axis to form kneading surfaces, and to emulate, in cross section, the location of an overrise on the sides of a conventional slice of bread. A generally planar side wall is connected to the end wall opposite the bowed side wall so that the cross sectional area thus emulates the bottom, sides and overrise of a conventional slice of bread. An opening opposite the end wall is provided for receiving the bread ingredients and for removal of the bread.

The bread pans may be composed of aluminum, glass, or ceramic. A transparent bread pan in combination with the transparent cover on the bread maker permits a user to visually monitor the bread making cycles.

The ribs form grooves on outside surfaces of the pair of opposite side walls to form gripping surfaces to aid in handling the bread pan.

The present invention also relates to a method of emulating conventionally baked bread using an automatic bread maker. The bread pans are vertically oriented during baking along a vertical axis so that the cross section emulates a conventional slice of the bread.

BRIEF DESCRIPTION OF THE DRAWINGS

FIG. 11 is a perspective view of a preferred bread pan;

FIG. 12 is a bottom perspective view of the bread pan of FIG. 11;

FIG. 13 is a bottom perspective view of a preferred drive chamber for a bread maker;

FIG. 16 is a timing chart for a preferred bread maker;

DETAILED DESCRIPTION OF THE PREFERRED EMBODIMENTS

Figure 1:
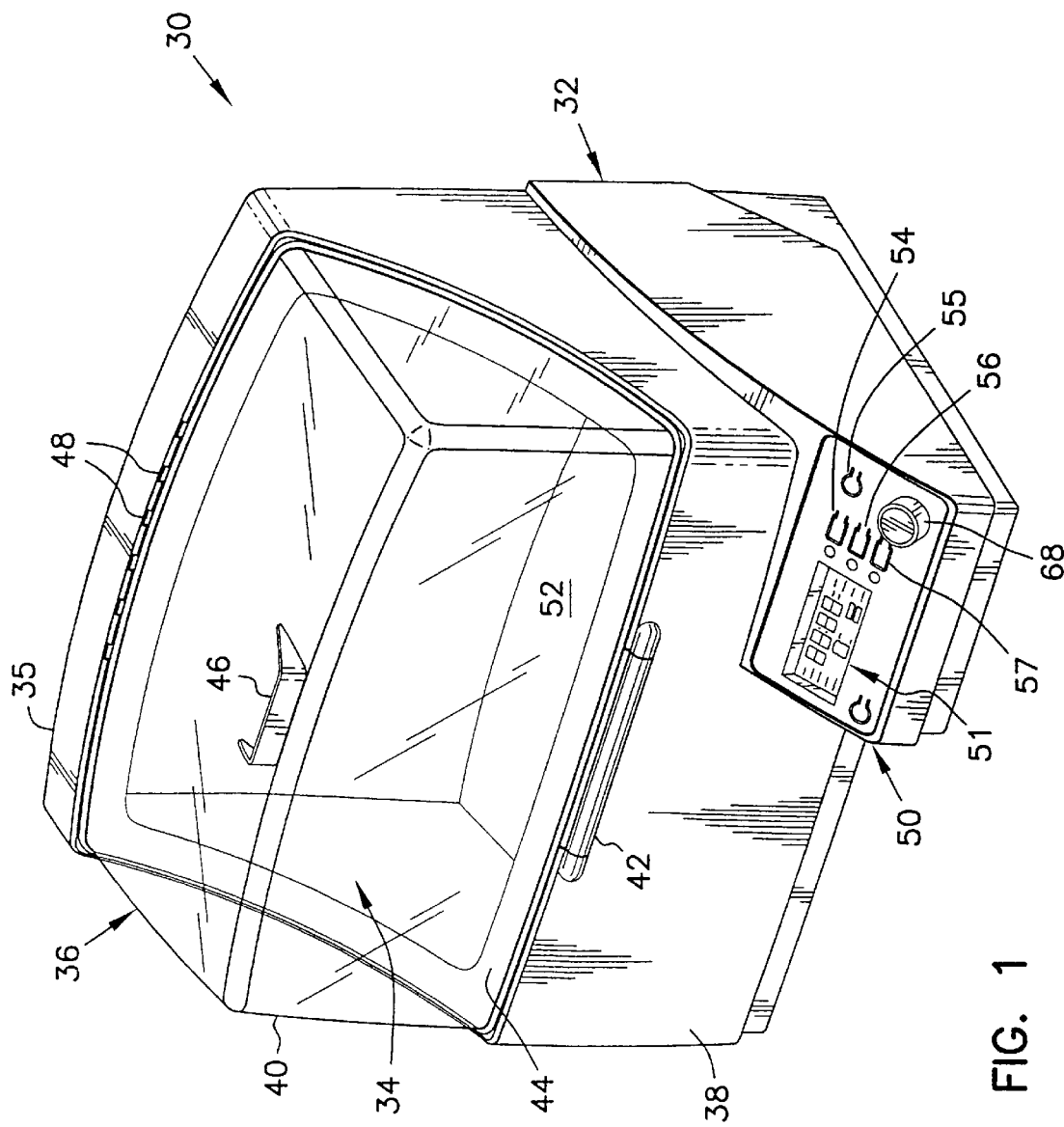
FIG. 1 is a perspective view of a bread maker.
Figure 2:
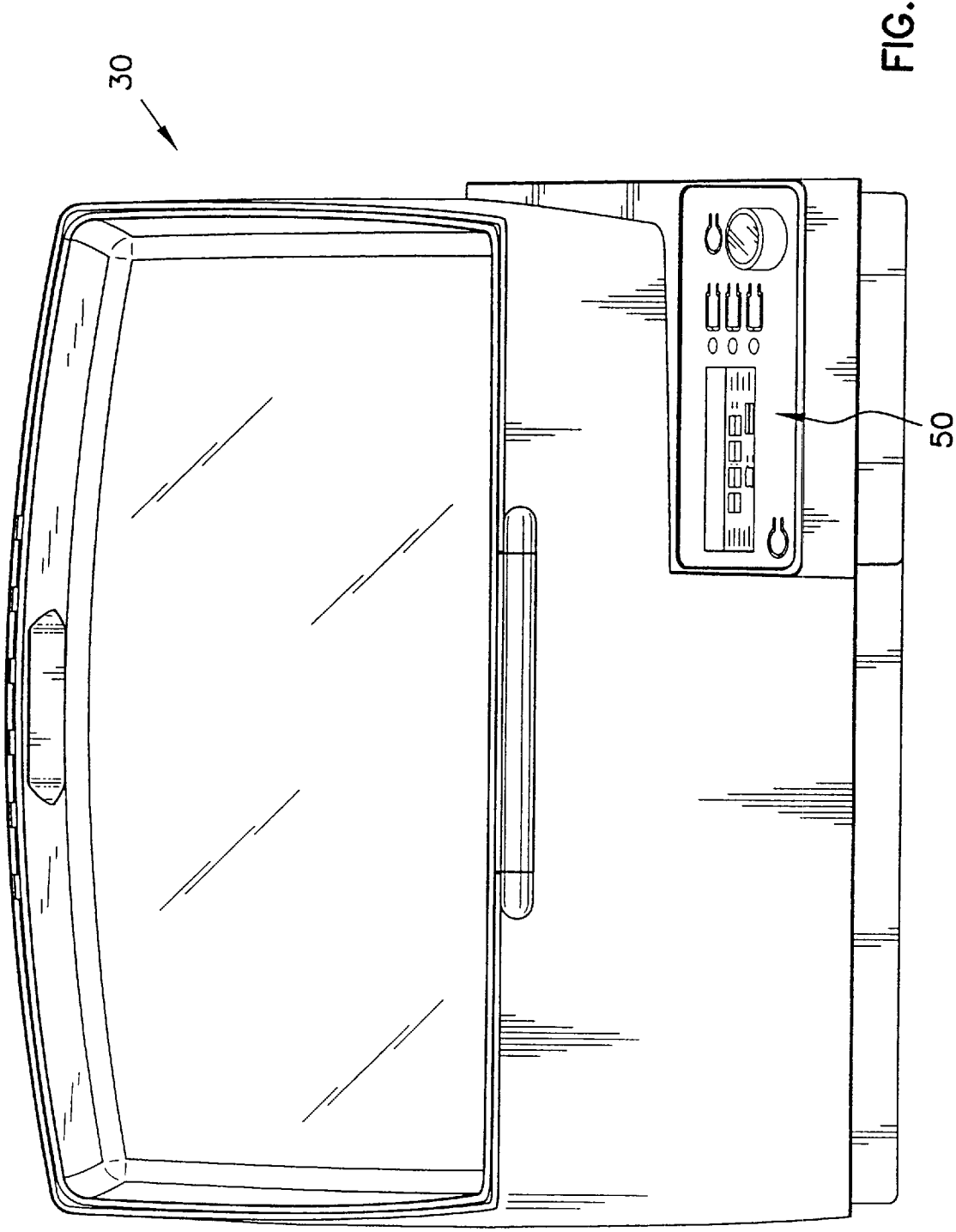
FIG. 2 is a front elevation view of the breadmaker shown in FIG. 1.

FIGS. 1–7 illustrates a preferred bread maker 30 with front-loading capabilities. The bread maker 30 consists of a generally rectangular housing 32, with an opening 34 that extends generally across the top 36 and front 38 of a housing 32. A cover 40 having a generally triangular cross section is attached to the housing 32 by a hinge 42 located along the front edge 44 of the housing 32. A handle 46 may be included to assist in opening the cover 40 when the bread maker 30 is hot. Alternatively, the cover 40 may simply rest on the housing 32 across the opening 34 without the hinge 42. In yet another alternative embodiment, the cover 40 may hinged at the left or right edges so as to open generally horizontally. A plurality of vents 48 preferably are included at the intersection of the housing 32 and the top edge 49 of the cover 40 to allow steam to escape during the baking cycle (see FIG. 8). The cover 40 preferably is constructed from a transparent material which is clear, as will be discussed below. The transparent cover 40 may alternatively be tinted yellow or some other suitable color.

Figure 8:
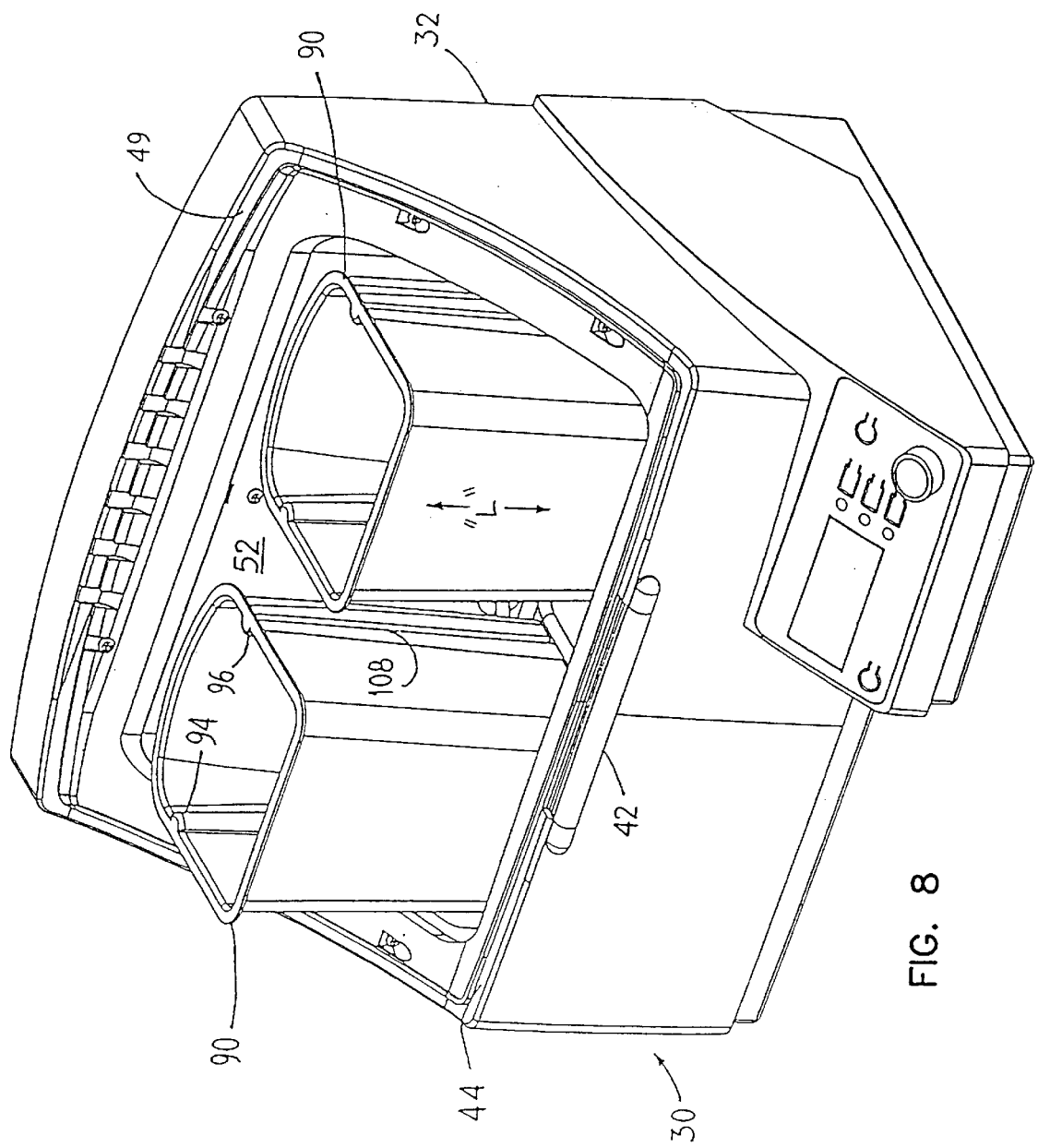
FIG. 8 is a perspective view of a bread maker containing a pair of bread pans.
Figure 23:
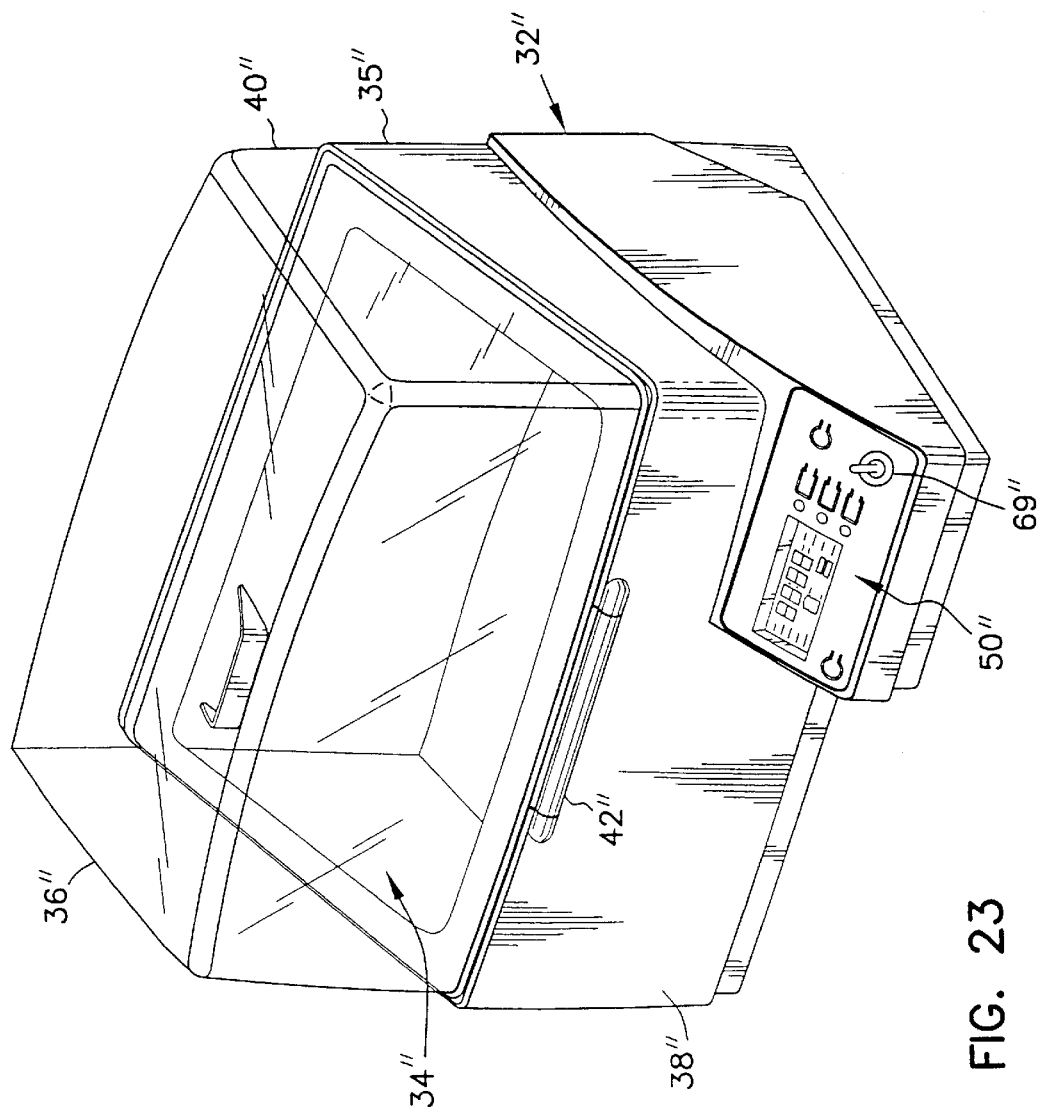
FIG. 23 is a perspective view of an alternate bread maker.

The opening 34 extends across at least a portion of the front 38 and top 36 to permit generally horizontal insertion and extraction of a bread pan 90 substantially from the front 34 of the housing 32 (see FIG. 8). The opening 34 may be defined by the intersection of a planar surface with the front 38 and top 36. It will be understood that the opening 34 may alternatively include the entire top 36 and may extend down a portion of the back 35 of the housing 32. FIG. 23 illustrates an alternate embodiment wherein the opening 34" extends across the front 38", the top 36" and the upper portion of the back 3511 of housing 32". Cover 40" may optionally be attached to the housing 32" by hinge 42".

Figure 17:
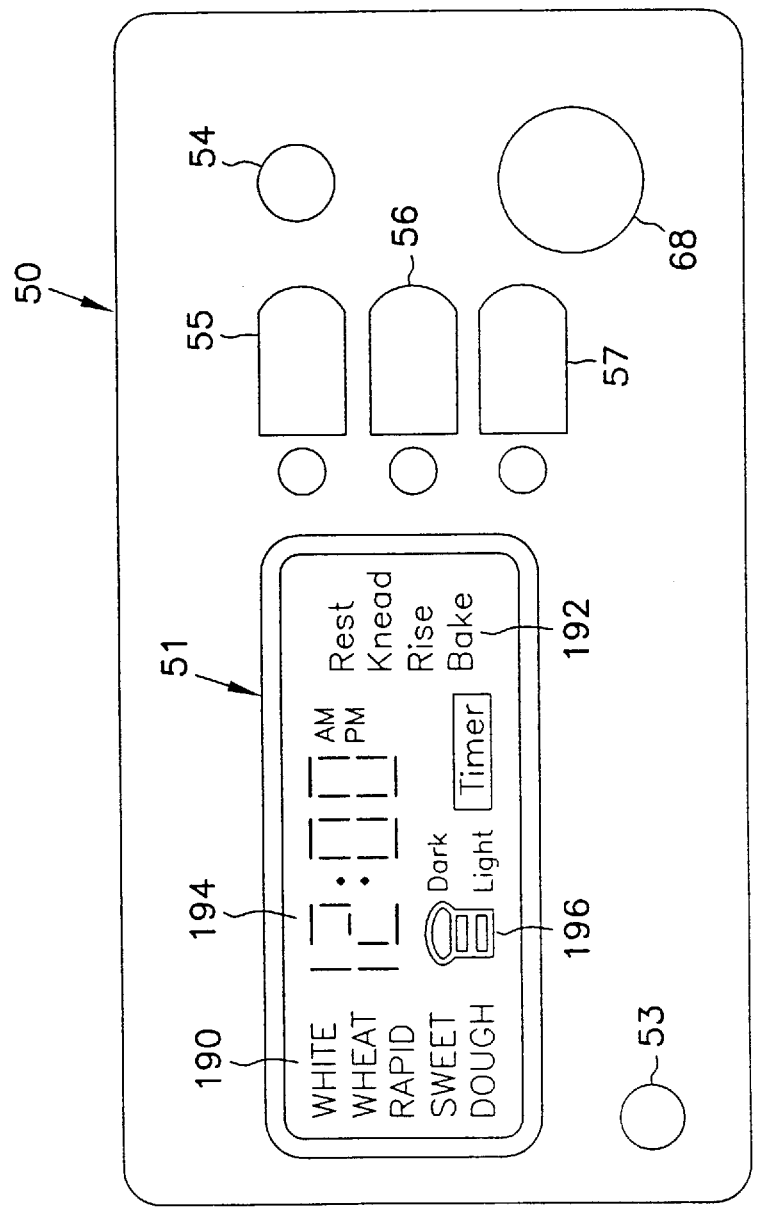
FIG. 17 is a preferred display for a bread maker.

Returning to FIG. 1, a control panel 50 is integrally formed with the housing 32 along the front lower edge thereof. Liquid crystal display (LCD) 51 contains information for programming the bread maker 30. FIG. 17 illustrates the display 51 on the control panel 50. Along the left edge of the LCD display 51 are the BREAD TYPE selections 190: WHITE, WHEAT, RAPID, SWEET, and DOUGH. The right side of the display 51 illustrates the cycle 192 being executed by the bread machine 30: REST, KNEAD, RISE, BAKE. The BAKE indicator is also used to indicate a bake only mode, as will be discussed below. Underneath the clock 194 is an icon of a slice of bread 196, which designates the selected CRUST COLOR to the user.

Figure 30:
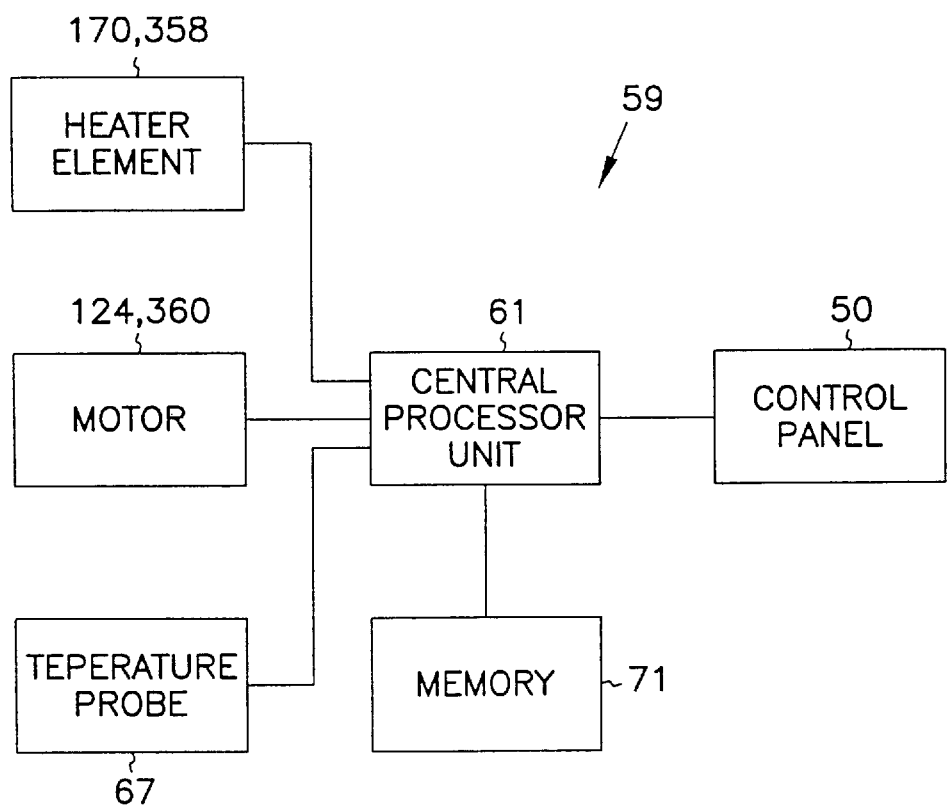
FIG. 30 is a schematic illustration of a control circuit for the present bread maker.

A control circuit 59 preferably is located directly beneath the control panel 50 so as to be below the mixing and cooking chamber 52 and remote from the heating element of the bread maker 30 (see FIG. 30). The control circuit contains a central processing unit (CPU) 61 for monitoring and controlling a heater element 170, a motor 124 for kneading the dough, and a temperature probe 67 according to the bread making parameters in FIG. 16. Non-volatile memory 71 is provided for retaining the bread making parameters and software for programming and controlling the bread maker 30 (see FIGS. 18–22).

Adjacent to the display 51 is a START-STOP button 54 and buttons for programming BREAD TYPE 55, CRUST COLOR 56, and FINISH TIME 57. Below the display 51 is a CLOCK SET button 53. A knob 68 is provided for incrementing/decrementing between selections within each programming mode, as will be discussed below.

If BREAD TYPE 55 is selected, rotating the knob 68 pages through each of the BREAD TYPES 190 listed on the display 51 (WHITE, WHEAT, RAPID, SWEET, DOUGH), jumps to BAKE on the bread cycles listed at 192, and back to the BREAD TYPES 190. If the BAKE cycle is selected, the bread maker 30 operates in a bake only mode where the CPU 61 controls the heater element 170 to maintain optimum baking temperature. The user sets the duration of the BAKE cycle by programming a FINISH TIME 57, as will be discussed in connection with FIG. 21. If DOUGH is selected, the bread maker 30 will prepare the dough according to the dough cycle set forth in FIG. 16.

The BAKE only cycle allows a user to deviate from the pre-programmed bake cycles set forth in FIG. 16. In particular, a user may mix dough using the DOUGH 190 cycle and bake the dough using a programmable BAKE 192 cycle. Separating these functions has a number of advantages. For example, dough may be prepared using the bread maker 30 using the DOUGH cycle and subsequently baked in a conventional oven. Alternatively, dough may be prepared by hand, or by another method, and subsequently baked in the bread maker 30 using the programmable BAKE cycle 192. For example, quick breads do not require yeast. Using one of the bread cycles listed in FIG. 16 is not desirable since yeast-free bread does not require kneading and does not rise. Yeast free breads can be mixed by hand and baked in the bread maker 30 using the BAKE cycle 192. It will be understood that the separate DOUGH and BAKE cycles can be combined in a variety of ways, and that the present invention is not limited to the example discussed herein.

Figure 3:
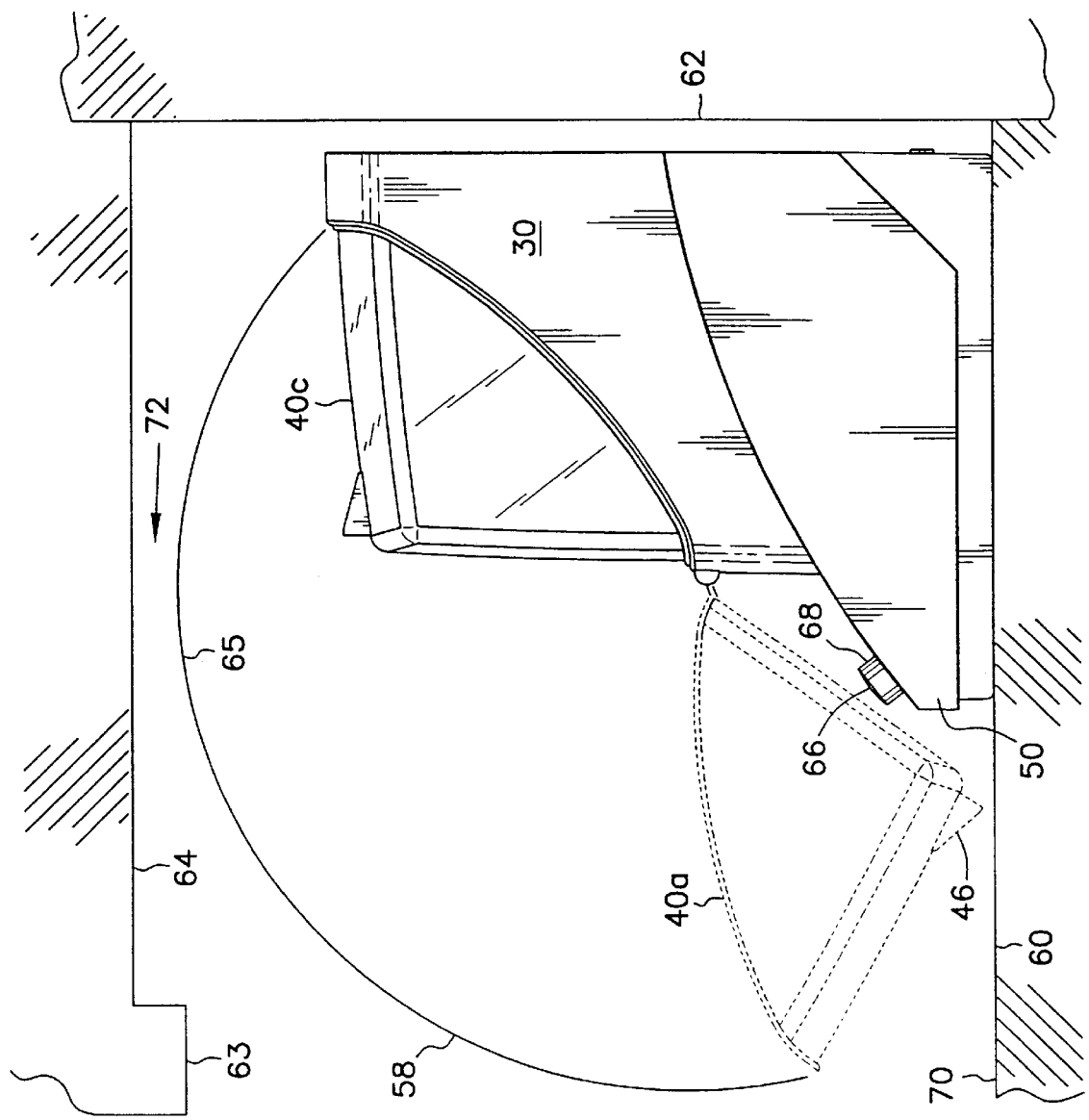
FIG. 3 is a right side view of the bread maker shown in FIG. 1.

The control panel 50 may be either curved or planar and is positioned at an angle relative to horizontal so that the bread maker 30 can be easily operated when located underneath an overhead kitchen cabinet (see FIG. 3). The preferred control panel 50 is slightly curved so that a line tangent to the center of the panel 50 forms an angle between 30° and 60° with horizontal, and preferably at 38°.

The control panel 50 combines the convenience of push button programming to select the desired mode (BREAD TYPE, CRUST COLOR, FINISH TIME, CLOCK SET) with the simplicity of a conventional knob 68 for incrementing/decrementing within each mode. Combining the best of both worlds provides the present bread makers with true user friendly programming. Alternatively, joy stick 69" may be substituted for knob 68 on control panel 50" (see FIG. 23). A sliding actuator may also be substituted for the joy stick 69".

FIG. 16 is an exemplary timing chart for the present bread makers for various types of bread. It will be understood that the amount of time allocated to each step of the bread making sequences of FIG. 16 may be changed without departing from the scope of the present invention. The optimum temperature to knead, rest, punch down, and rise bread dough is between 88°–90° F. During operation of the bread maker 30, the CPU 61 turns on the heater element 170 for approximately 16 seconds at the beginning of each step set forth in FIG. 16. The cumulative effect of activating the heater element 170 briefly at the beginning of the 1st Knead, Rest, 2nd Knead, 1st Rise, Punch Down, and 2nd Rise steps is that the mixing and cooking chamber 52 maintains a temperature of between 88°–90° F. The optimum baking temperature is 350° F. The CPU 61 monitors the temperature probe 67 and activates the heater element 170 periodically to maintain the target temperature. Alternative exemplary bread making cycles are illustrated in U.S. Pat. No. 4,762,057 issued to Hirota et al. and U.S. Pat. No. 4,538,509 issued to Ojima et al.

FIG. 3 is a side view of the bread machine 30 located on a counter 60 adjacent to a wall 62 directly under an overhead kitchen cabinet 64. An eave 63 is shown on the front edge of the overhead cabinet 64. The bread machine 30 requires a clearance of approximately 44.7 mm (17.6 inches). The separation between the bottom of the overhead cabinet 64 and counter 60 for a modern kitchen is generally greater than 46.72 cm (18 inches), although the separation between the eave 63 and the counter 60 may be less than 18 inches. The counter 60 in a standard kitchen is typically 60.96 mm (24 inches) deep, while the overhead cabinet 64 is typically 30.48 mm (12 inches) deep.

The cover 40 is movable between a closed position $40_c$ for substantially enclosing the opening 34 and an open position 40 a generally horizontally off-set from the front 38 of the housing 32. Arc 58 illustrates the movement of the cover 40 from the closed to the open position. Top space 72 illustrates the clearance between the top of the arc 65 of the cover 40 relative to standardized cabinet 64. As is illustrated in FIG. 3, the top of the arc 58 may be higher than the eave 63 without interference, due to the curved path of the cover 40. The handle 46 on the cover 40 rests on the counter 60 so that a space 66 is created between the cover 40 and the knob 68 on the control panel 50. The space 66 prevents the cover from being scratched by the knob 68 or heat being transferred from the cover 40 to the control panel 50. Alternatively, an end-stop may be included to prevent the cover 40 from contacting the control panel 50 when the bread maker 30 is located on the front edge 70 of a counter 60.

As will be discussed in detail below, bread pans can be easily loaded and unloaded while the bread maker 30 is located under an overhead cabinet. Prior art bread makers that are loaded from the top must be moved to the front edge 70 of the counter 60 for at least loading and unloading. Since the bread maker 30 can be operated when located adjacent to a rear wall 62 under a cabinet 64, the front edge 70 of the counter is available for other cooking tasks.

Figure 4:
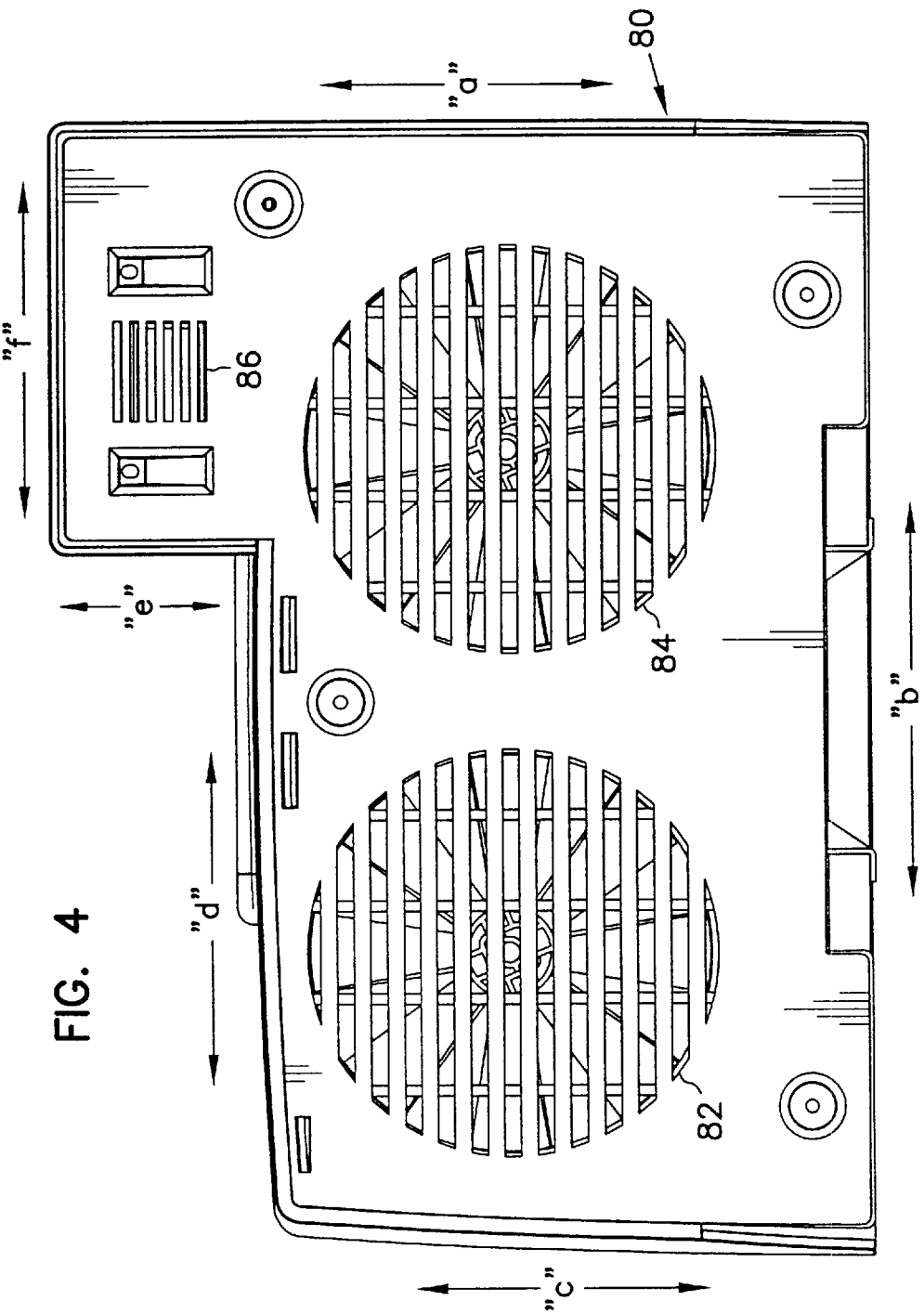
FIG. 4 is a bottom plan view of the bread maker shown in FIG. 1.
Figure 5:
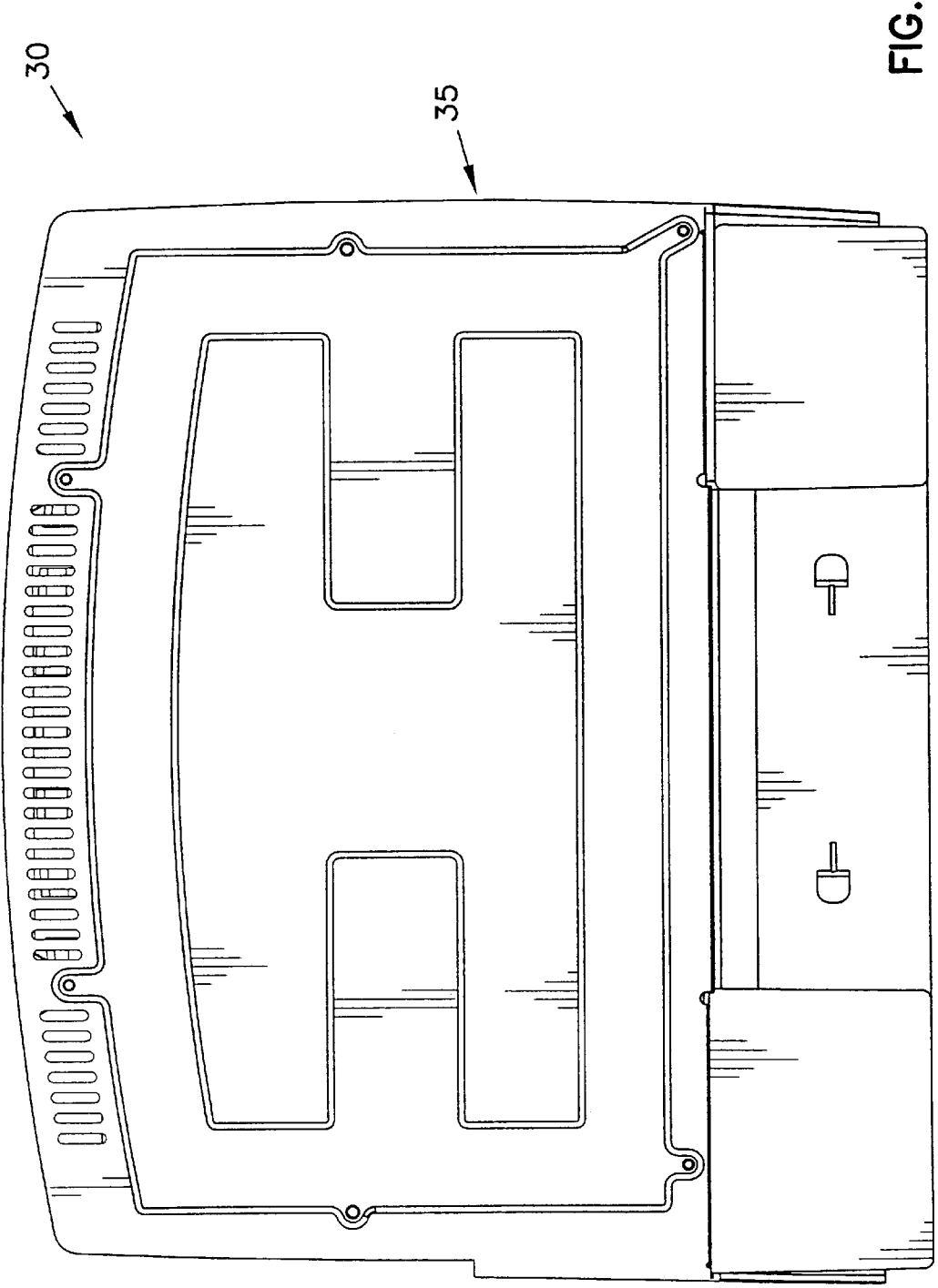
FIG. 5 is a rear elevation view of the breadmaker shown in FIG. 1.
Figure 6:
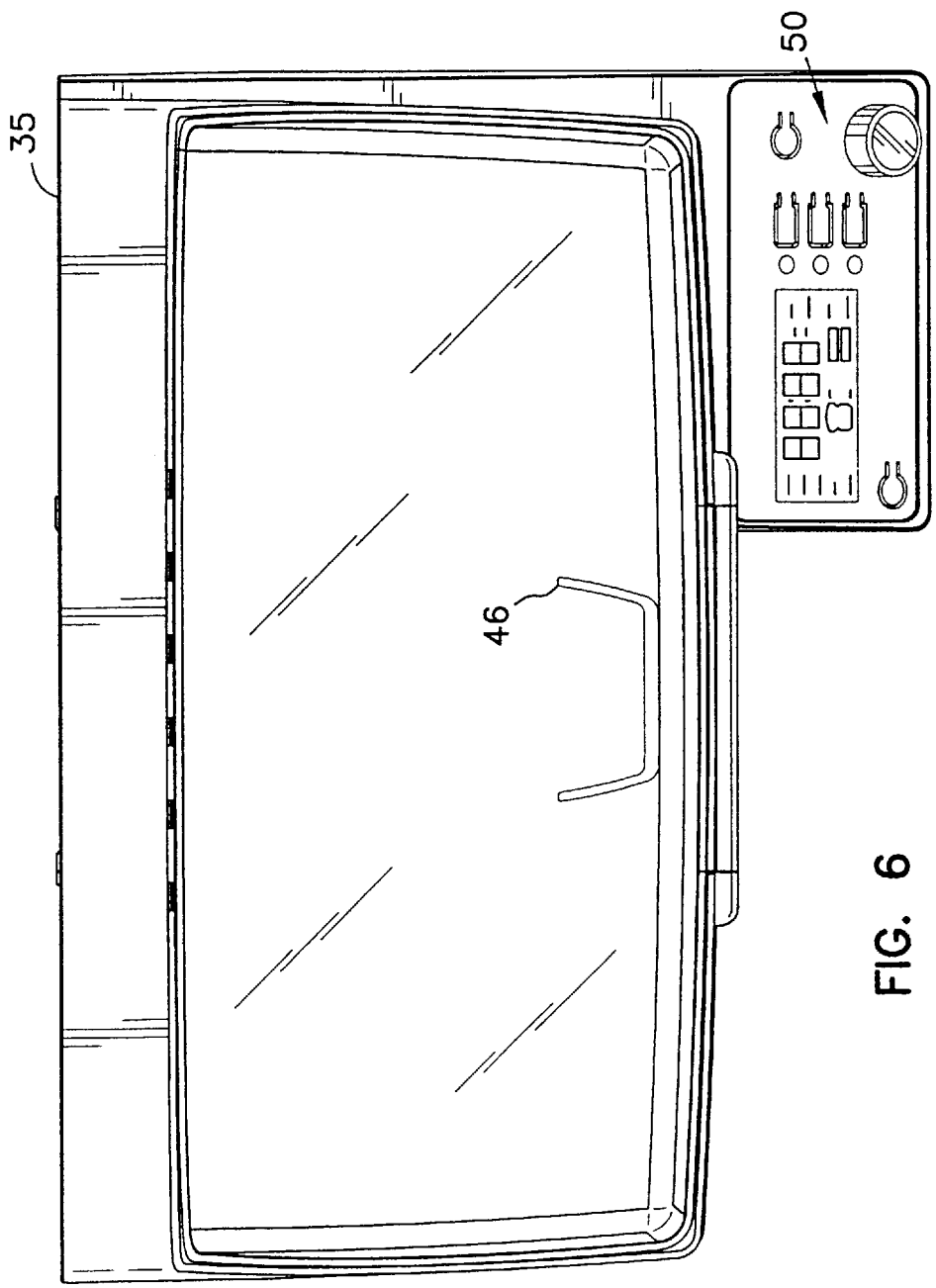
FIG. 6 is a top plan view of the bread maker shown in FIG. 1.
Figure 7:
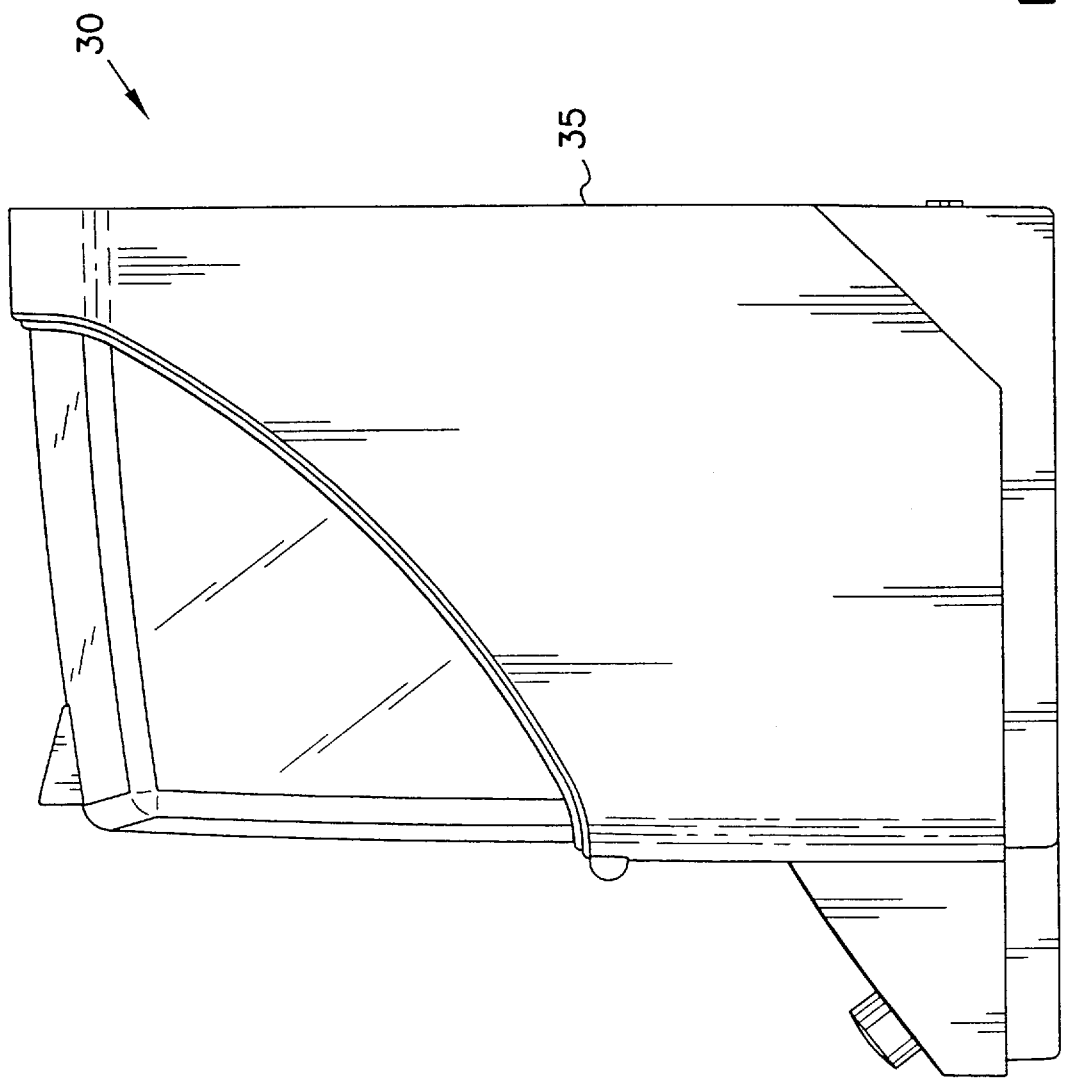
FIG. 7 is a left side view of the breadmaker shown in FIG. 1.

FIG. 4 illustrates a bottom panel 80 of the bread maker 30. The bottom panel 80 preferably includes a pair of fan pulley vents 82, 84, which will be discussed in greater detail below. A control panel vent 86 may also be provided for cooling the control circuit 59. The "footprint" of the bottom panel 80 is designed to utilize a minimum amount of space on the counter 60. A preferred bottom panel 80 of the present bread maker 30 is approximately 30.48 cm (12") along the a-axis; 41.91 cm (16.5") along the b-axis; 215.9 cm (8.5") along the c-axis; 25.4 cm (10") along the d-axis; 76.2 cm (3") along the d-axis; and 152.4 cm (6") along the e-axis. The bottom panel 80 for the two-loaf bread maker 30 preferably has a footprint less than 1032.26 cm$^2$ (160 square inches), or slightly more than one square foot. Prior art bread makers, which make a single loaf of bread, generally have a footprint between 774.19 cm$^2$ and 1032.26 cm$^2$ (120 and 160 square inches (average 903.22 cm$^2$ (140 sq. in.)), based on an evaluation of automatic bread makers performed by Innovative Cooking Enterprises, Inc. of Anchorage, Ak., which is hereby incorporated by reference. Consequently, the present bread maker 30 utilizes comparable counter space to the prior art bread makers, yet makes two loaves of bread simultaneously.

FIG. 8 is a perspective view of the bread maker 30 containing first and second bread pans 90 arranged side by side in the mixing and cooking chamber 52. The bread pans 90 are vertically oriented along longitudinal axis "L" in the breach chamber 52. It will be understood that the bread pans 90 may alternatively be arranged in a front-to-back configuration, rather than the lateral or left-to-right configuration shown in FIG. 8. A bread pan 90 is removed from the bread maker 30 by gripping the finger grip surfaces 106, 108 (see FIGS. 11 and 12) and lifting the pan 90 vertically. The bread pans 90 need only be lifted high enough for a well coupler 112 (see FIGS. 11 and 12) to clear the front edge 44 of the housing 32. Alternatively, the bread pans 90 may be gripped by the lip 104. The bread pans 90 can then be moved horizontally underneath the cabinet 64 (see FIG. 3) without moving the bread machine 30.

The finger grip surfaces 106, 108 are also ideal for handling the hot bread pan 90 after the bread is baked. The pan 90 is generally turned up side down and shaken to remove the bread. The finger grip surfaces 106, 108 allow the user to securely grip the pan 90 with sufficient force to safely remove the bread.

Figure 9:
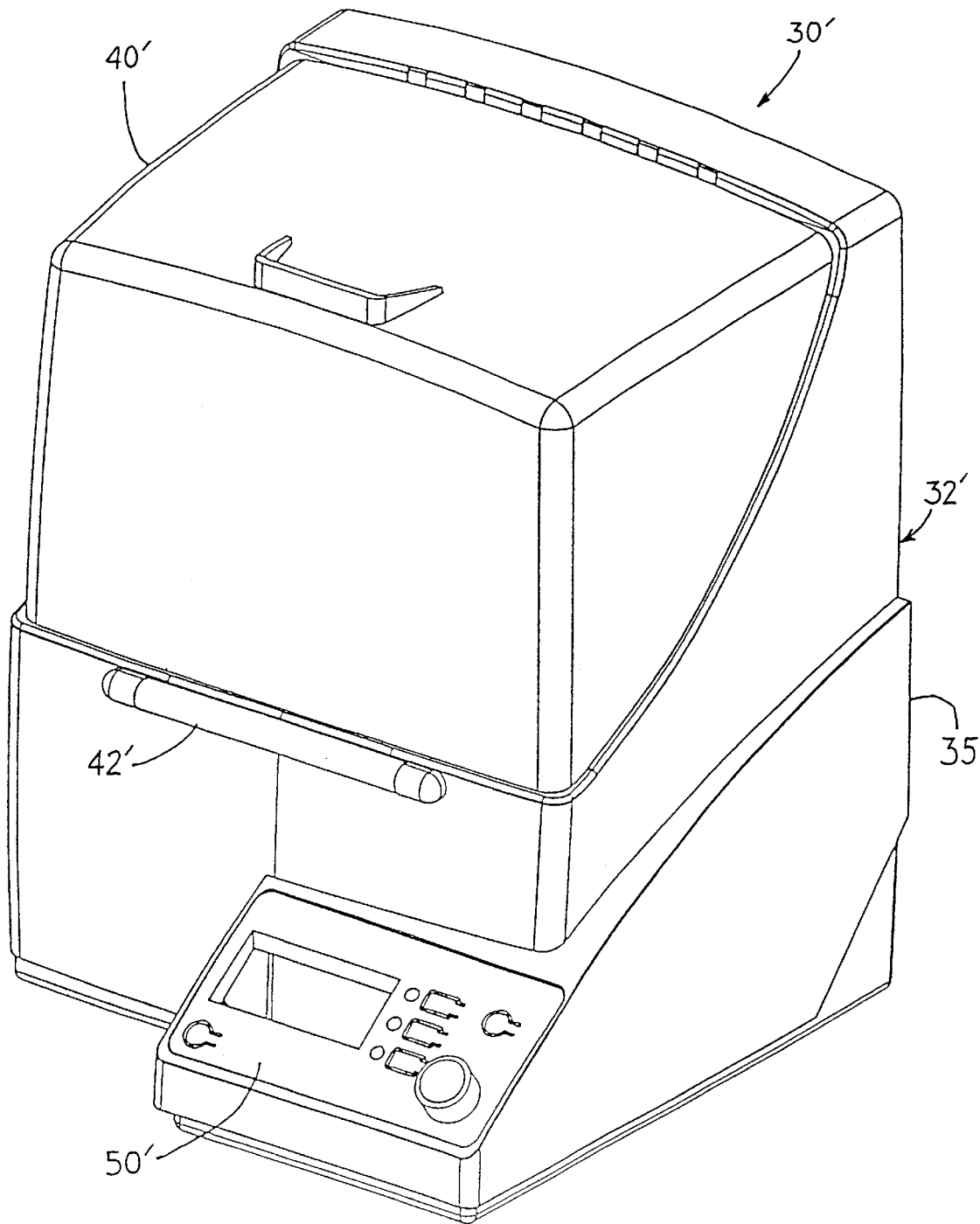
FIG. 9 is a perspective view of an alternate bread maker.
Figure 10:
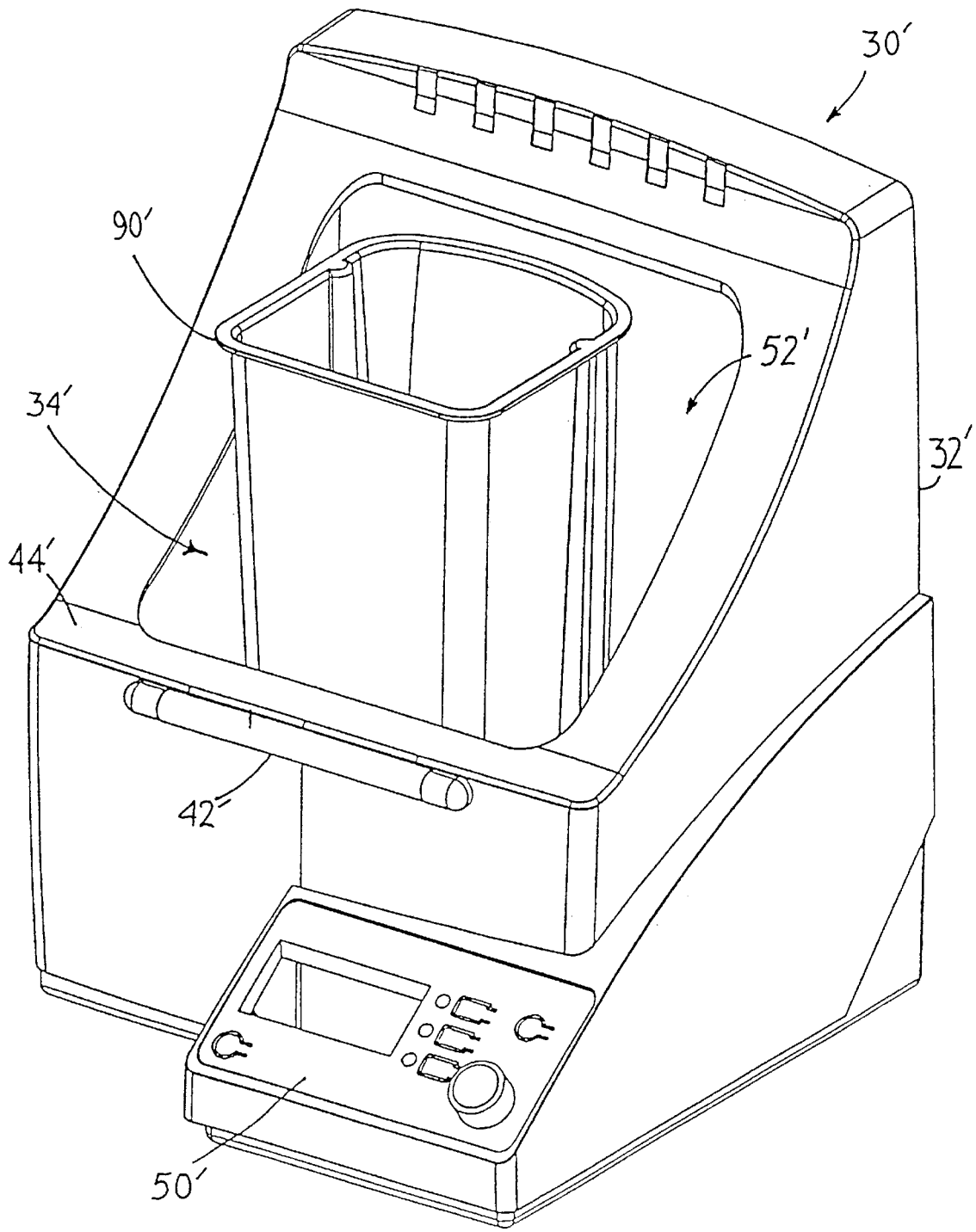
FIG. 10 is a perspective view of an alternate bread maker containing a single bread pan.

FIGS. 9 and 10 illustrate an alternate frontloading bread maker 30' for making a single loaf of bread. The mixing and cooking chamber 52' contains a single bread pan 90'. Cover 40' is attached to the housing 32' by a hinge 42' located along the front lower edge 44' of the bread maker opening 34'. Control panel 50' is located along the front lower edge of the housing 32'. The control panel 50' preferably contains display 51. Additionally, the housing 32' may be extended in the back 35' so that a second bread pan 90 may be included in a front-to-back configuration. It will be understood that the bread maker 30' may be substantially the same in construction and design as the two-loaf bread maker 30 discussed throughout this specification, and as such, references to the two-loaf machine 30 are generally applicable to the single loaf machine 30'.

The covers on prior art bread makers are generally metal. Consequently, it is extremely difficult to clean bread dough or miscellaneous ingredients that are "cooked-on" to this surface. Moreover, a number of prior art bread makers have steam vents in the top cover of their machines. If the bread dough rises into these vents, the vents can become clogged with dough, which is subsequently cooked onto the vent surfaces. Although the bread makers of the present invention may be constructed of a variety of materials, including metal and high temperature plastics, the housing and cover preferably are constructed of a high temperature thermoplastic. One advantage of the plastic construction is low thermal conductivity relative to metal, allowing the cover to be opened by hand even during the bake cycle. Additionally, bread does not stick to the preferred plastic construction of the present bread makers, and in particular the plastic covers. A thermoplastic sold under the name Lexan 4704 available from General Electric Company located at Pittsfield, Mass. is known to be suitable for this purpose. Alternatively, a thermoplastic sold under the trade name Udel P-1700 available from Amoco Oil Company, located at Alpharetta, Ga. is also known to be suitable for this purpose. Both of these plastics are approved for contact with food and are dishwasher safe.

FIGS. 11, 12 and 24–29 illustrate the geometry of the bread pan 90. Left and right pseudo-overrise ribs 94, 96 on opposite sides 98, 100, respectively, extend into bread chamber 88. The pseudo-overrise ribs 94, 96 serve as kneading surface which stress the dough to promote gluten production. The ribs 94, 96 extend from the bottom 102 to the top lip 104 of the bread pan 90. As is best seen in FIGS. 24–29, the pseudo-overrise ribs 94, 96 preferably are tapered so that they are slightly wider at the bottom 102 of the bread pan 90. The side walls 98, 100, 107, 110 preferably are tapered also so that the bread pan 90 is wider at opening 101 than at the bottom 104. The taper aids in manufacturing the bread pan 90 and facilities removal of the bread after baking.

It will also be understood that the present bread maker 30 may be used as a dough mixer, where the dough is removed without baking. Extending the pseudo-overrise ribs 94, 96 the full height of the bread pan 90 allows the entire bread chamber 88 to be used for dough mixing purposes, allowing larger quantities of dough to be prepared. On the other hand, the ribs in prior art bread makers are limited to the lower half of the bread pan, and the dough is generally not permitted to extend above these ribs during mixing.

Figure 24:
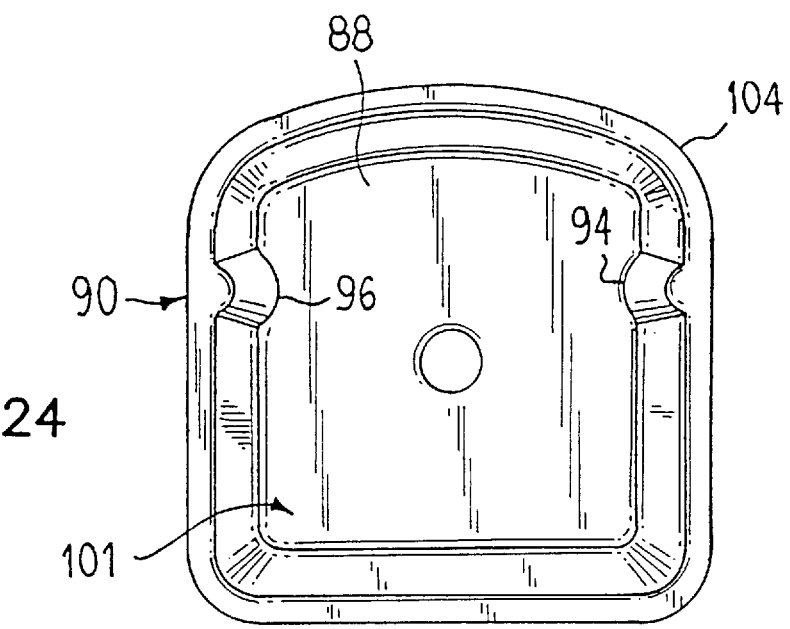
FIG. 24 is a top view of the bread pan of FIGS. 11 and 12.
Figure 25:
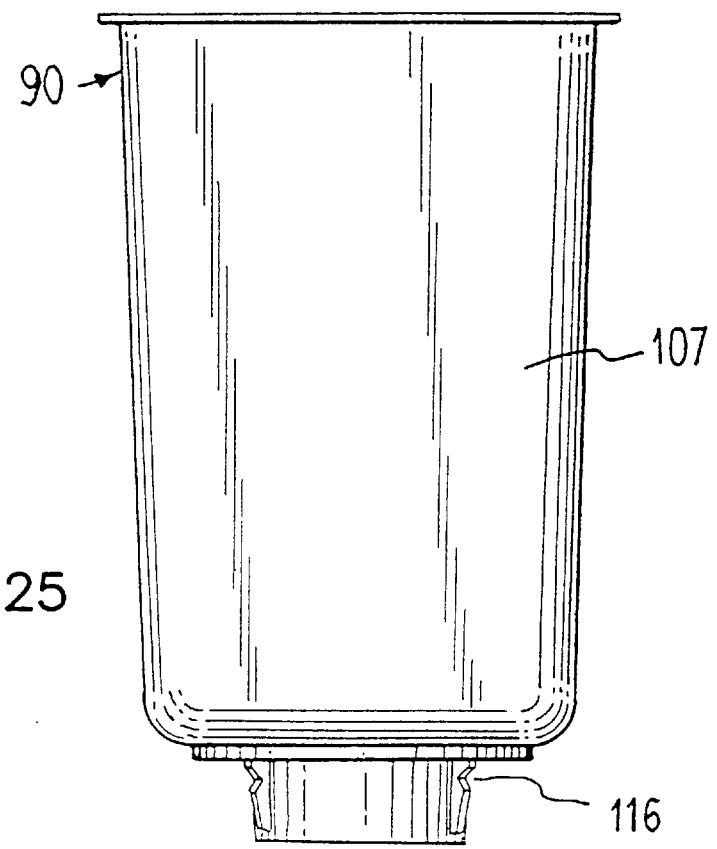
FIG. 25 is a side view of the bread pan of FIGS. 11 and 12.
Figure 26:
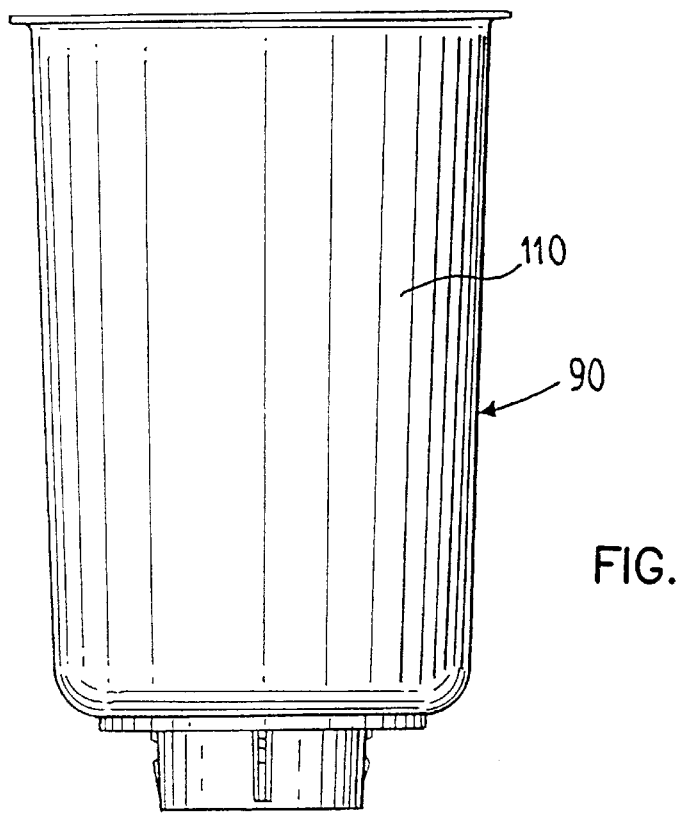
FIG. 26 is a side view of the curved side of the bread pan in FIGS. 11 and 12.
Figure 27:
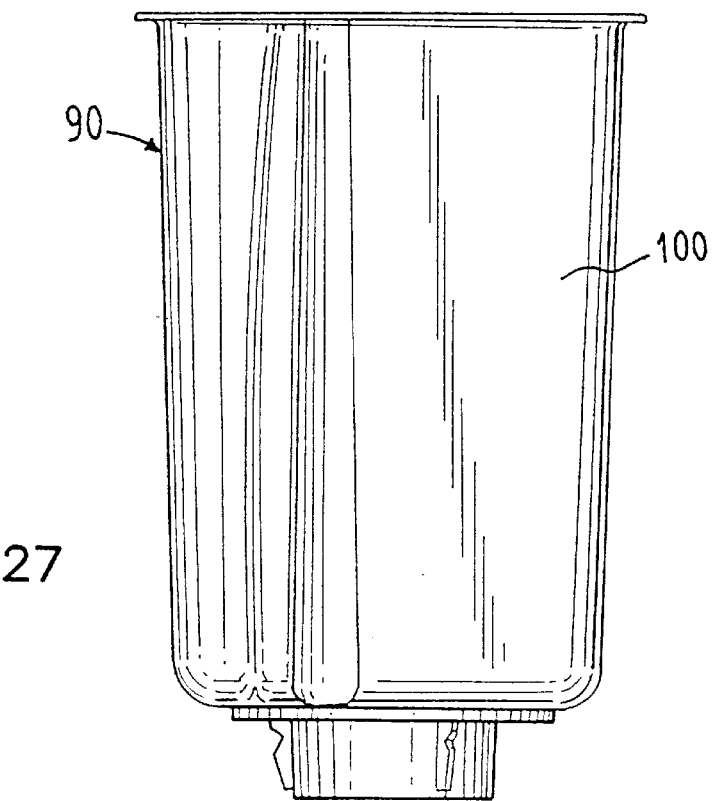
FIG. 27 is a side view of the bread pan of FIGS. 11 and 12.
Figure 28:
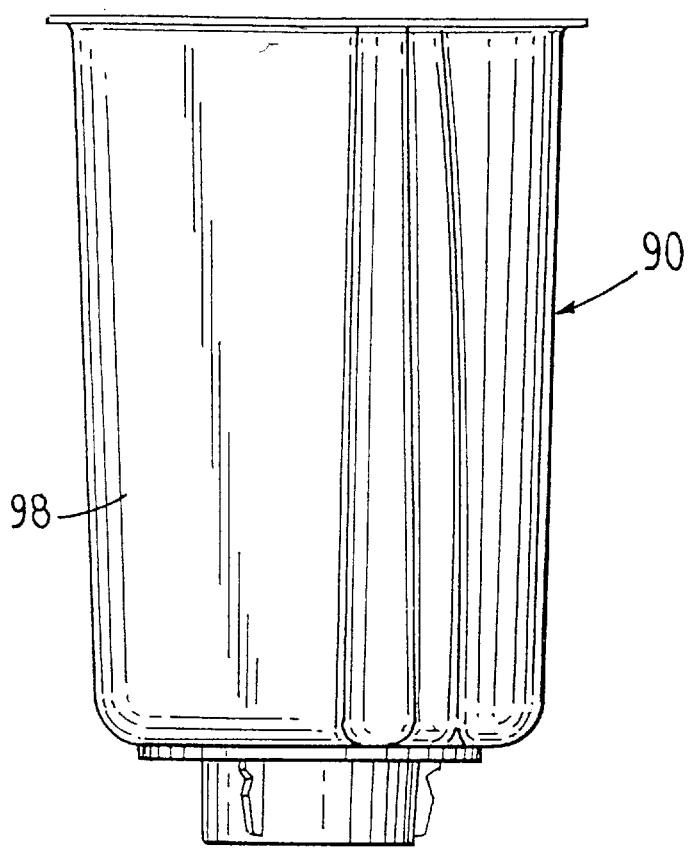
FIG. 28 is a side view of the bread pan of FIGS. 11 and 12.
Figure 29:
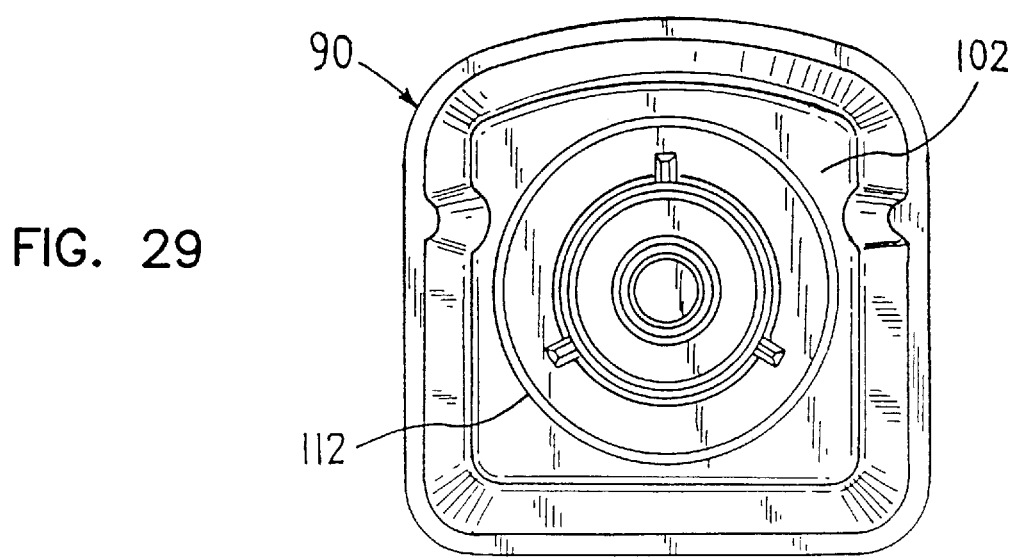
FIG. 29 is a bottom view of the bread pan of FIGS. 11 and 12.

As will be discussed below, the pseudo-overrise ribs 94, 96 form finger grip surfaces 106, 108 on the exterior of the bread pan 90 to facilitate removing the hot bread pans from the mixing and cooking chamber 52. Side 107 of the bread pan 90, forming the bottom of the loaf of bread, is essentially planar. However, fourth side 110 of the bread pan 90 is curved or bowed to create a pseudo-overrise region 118 to simulate the overrise of conventional bread. The finished bread is removed from the bread pan 90 and placed on the side formed by the planar surface 107 so that the overrise region 118 defines the top of the loaf, as best illustrated in FIG. 24. The bread pan 90 has additional advantages which will be discussed in connection with the operation of the present bread makers discussed below.

The bread pan 90 may be constructed from a variety of materials, including for example cast or stamped aluminum, or glass. Using a glass bread pan in combination with the transparent cover allows the user to visually monitor the bread making process and is educational for children. For example, the user can visually check if the mixing paddle 140 (see FIGS. 14 and 15) was inadvertently omitted from the bread pan or if a loaf has collapsed.

The bread chamber 88 preferably is coated with a non-stick finish. The non-stick finish sold under the trade name Silverstone available from DuPont Bakeware is known to be suitable for this purpose. Constructing the bread pan 90 from cast aluminum has a number of advantages. First, the bread pan is significantly more durable than stamped aluminum pans. Additionally, the mass provided by the cast aluminum construction facilitates even heat distribution within the bread chamber 88.

The bread chamber 88 of the present bread pan 90 is designed to have the dimensions similar to a conventional loaf of bread. The vertical orientation of the bread pan 90 permit the user to make various size loaves, up to 2 pounds. The bread pan geometry is designed to be narrower and taller than prior art bread pans so as to maximize the ratio of the bread pan surface area-to-pan opening surface area. The bread pan surface area is defined as the total surface area of sides 98, 100, 107, 110, and 102. The pan opening surface area is defined as the surface area or cross sectional area of the opening 101.

An exemplary embodiment of bread pan 90 as illustrated in FIG. 12 has the dimensions of 114.3 mm (4.5") along the x-axis, 111.125 mm (4.375") along the y-axis and 190.5 mm (7.5") along the z-axis. Consequently, the exemplary bread pan has a pan surface area equal to (2 ×7.5×4.5+2×7.5× 4.375+4.375×4.5) and a pan opening surface area equal to (4.375×4.5). The resulting pan surface area-to-pan opening ratio is approximately 7.762. Prior art bread pans for automatic bread makers typically have a pan surface area-to-opening surface area ratio between 5.1 and 6.33.

The present bread pan 90 therefore has an surface area-to-pan opening ratio approximately 20% greater than known prior art bread pans, which provides a number of advantages over the prior art pans. For example, the larger the surface area of the opening of a bread pan (for a given height), the greater the rise time required. Additionally, a greater quantity of yeast will be required to achieve comparable dough rise. It will be understood that the dimensions of the exemplary bread pan described above may vary as long as the ratio of pan surface area-to-pan opening is greater than 6.5, and preferably greater than 7.0.

It has been found that the present bread pan geometry provides a superior product in less time than prior art bread makers, for a number of reasons. The bread dough adheres to the inside surface of the bread chamber 88 so that the dough rises further and more quickly than in the shorter, wider prior art bread pans. In particular, the surface tension created between the dough and the inside surface of the bread chamber 88 supports the rising dough. Consequently, the dough rises more for the same quantity of yeast than it would in a shorter, wider bread pan. As a result, the present bread makers utilize yeast more efficiently than prior art bread makers.

The high surface area-to-opening ratio of the present bread pan geometry also shortens bake time. The minimum time to bake a single loaf of bread in a prior art bread is on average 2 hours and 50 minutes, based on an evaluation of automatic bread makers performed by Innovative Cooking Enterprises, Inc. previously incorporated by reference. However, the present bread maker 30 can produce two loaves of bread in two hours or less.

The tall, narrow bread pan 90 has the additional advantage of requiring less torque to knead the dough than would be required in a shorter, wider bread pan. The mixing paddle must reach generally to the side walls of the bread pan in order to effectively mix the dough. The shorter, wider bread pan requires a paddle that extends further from the drive axis so that higher torque is required to mix a given quantity of dough using a given paddle.

The vertical orientation of the bread pan 90 also minimizes the bread density differential in a single slice of bread. Bread density is greater at the bottom of a bread pan than at the top. The dough at the top of a bread pan tends to contain more air bubbles and have a lighter texture when baked. The present bread pan 90 is vertically oriented for baking so that the bread density is greater toward the bottom 102. However, the finished bread is oriented horizontally on the surface formed by the planar side 107 of the bread pan for slicing. The bread preferably is sliced along planes perpendicular to the pseudo-ribs 94, 96. Therefore, bread density varies horizontally in the loaf, from slice to slice, rather than within a single slice. Slice $S_1$ illustrated in FIG. 11 has a generally homogeneous density which is greater than the density of slice $S_2$. Likewise, slice $S_3$ has a generally homogeneous density which is less than the density of slices $S_1$ or $S_2$. Although the bread density inevitably varies from slice to slice, the critical feature of the present bread pan 90 is that the density for any given slice is generally homogenous.

FIGS. 11 and 12 also illustrates well coupler 112 located on the bottom 102 of a bread pan 90. Three bosses 114 with detents 116 are cast into the well coupler 112. The well coupler 112 engages with a corresponding component on the bread makers which will be discussed in detail below.

FIG. 13 is a perspective view of a drive mechanism 120 for the bread makers. The drive mechanism 120 preferably is located in a drive chamber 122 beneath the mixing and cooking chamber 52 so that heat rising during the baking cycle does not interfere with operation of the drive mechanism 120. A motor 124 is connected to a pair of fan pulleys 126, 128 by a drive belt 130. The fan pulleys 126, 128 have a plurality of fan blades 134 which serve to cool the drive chamber during operation. The fan blades 134 preferably are located directly over the fan pulley vents 82, 84 (see FIG. 4). It will be understood that a separate cooling fan may be used to supplement or replace the fan blades 134.

A drive pulley 132 on the motor 124 is located off center from an axis connecting the axes of the fan pulleys 126, 128.

As is clear from FIG. 13, one side of the drive belt 132 contacts fan pulleys 126, 128 and the other side contacts drive pulley 132. The drive belt 130 traverses a "B-shaped" configuration which maximizes the contact surface area between the drive belt 130 and the drive pulley 132, thereby minimizing slippage of the belt 132. The drive belt 130 engages the drive pulley 132 preferably between 150 and 180 degrees, and for at least 160°. The present drive belt 130 and drive pulley 132 combination can generate 70 in oz. of torque. It will be understood that the present drive mechanism 120 may alternatively be configured as a worm gear or a direct drive system.

Figure 14:
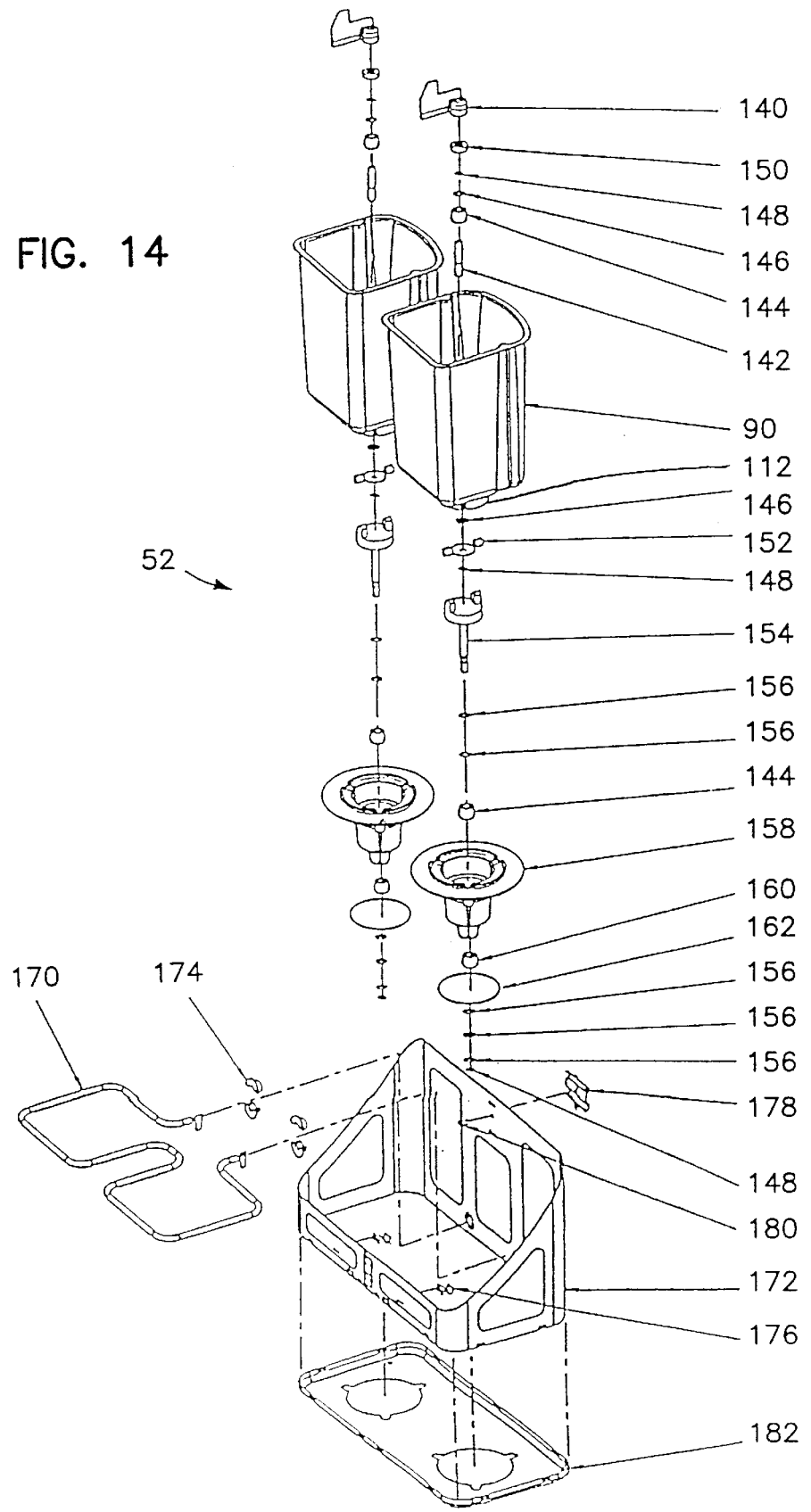
FIG. 14 is an exploded view of a preferred mixing and cooking chamber for a bread maker.
Figure 15:
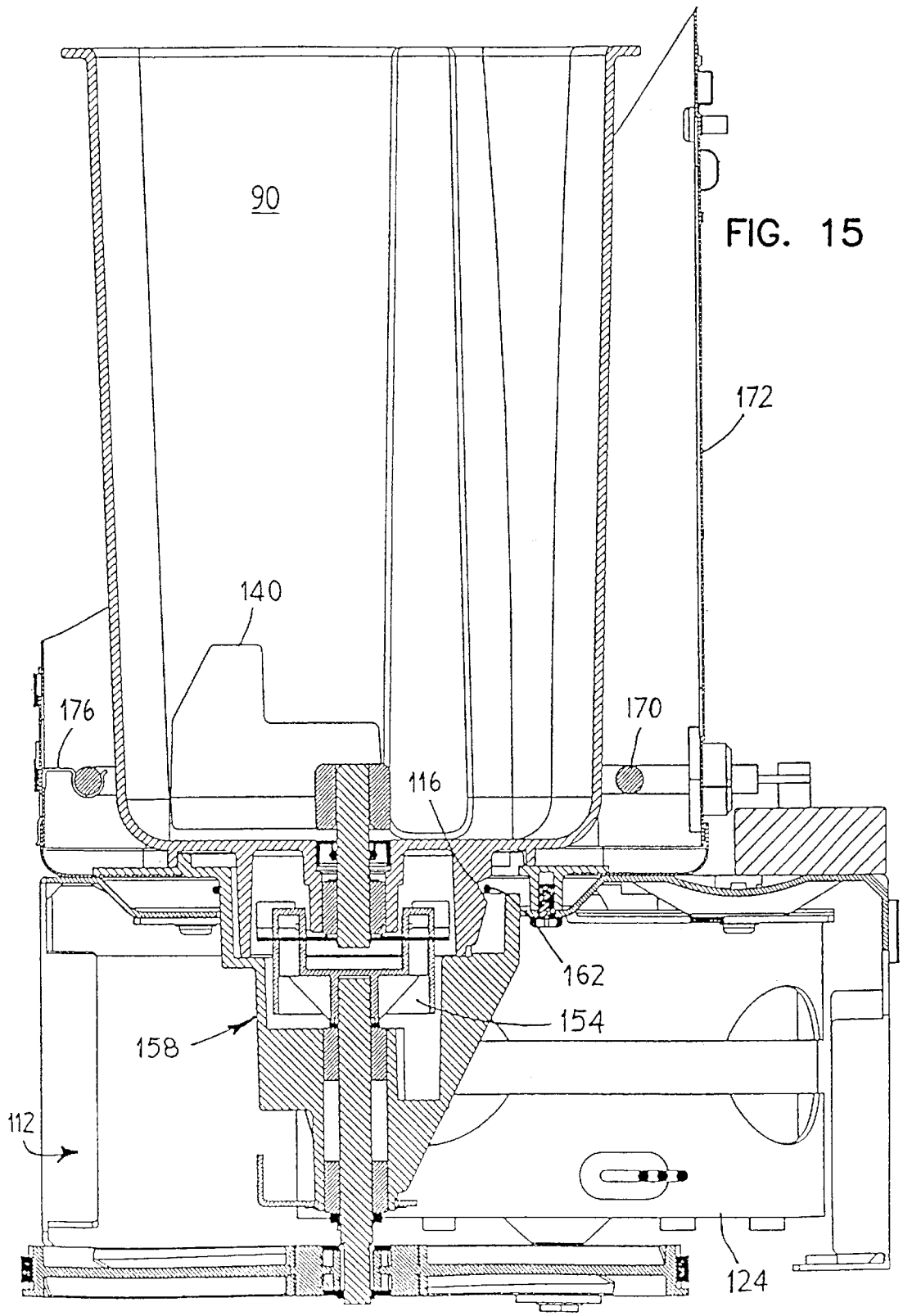
FIG. 15 is a sectional view of a drive mechanism and a bread pan for a bread maker.

FIGS. 14 and 15 illustrate the mixing and cooking chamber 52. The bread pans 90 each contain a mixing paddle 140 attached to a pan shaft 142. The mixing paddle 140 preferably is releasably attached to the shaft 142 so that alternate paddles may be substituted. For example, a taller paddle may be preferred if the present bread maker 30 is used as a dough mixer. A bearing sleeve 144 is placed on the shaft 142 along with a washer 146, retaining ring 148 and seal 150. The pan shaft 142 extends through the bottom of the bread pan 90 proximate the well coupler 112. A wing coupler 152 is attached to the bottom of the shaft 142 proximate the well coupler 112. A retaining ring 148 holds the wing coupler 152 to the shaft 142.

A drive coupler 154 connected to the fan pulleys (not shown) is provided for releasable engagement with the wing coupler 152. A pair of washers 156 are placed on the drive coupler shaft along with a bearing sleeve 144. The drive coupler shaft is then inserted into a well 158 which retains the bread pans 90 in the bread maker 30. A second bearing sleeve 160 is placed on the drive coupler shaft below the well 158. Additional washers 156 are also placed on the drive coupler shaft. A detent clip 162 is placed on the well 158 for engagement with the detents 116 on the bread pan (see FIGS. 11 and 15). The detent clip 162 preferably is cut to permit expansion and contraction.

A heater element 170 is attached to liner 172 by a ceramic grommet 174 and a pair of heater holders 176. The heater element 170 is generally shaped for receiving a pair of bread pans 90 so that the heat generated therefrom is uniformly distributed through the mixing and cooking chamber 52. A thermistor and thermal fuse bracket 178 is retained to the liner 172 by a screw 180. Temperature probe 67 is retained to the liner 172 by the bracket 178. In the preferred embodiment, the temperature probe 67 is a thermistor. A liner bottom 182 is engaged with the liner 172 to generally enclose the bottom of the mixing and cooking chamber 52 (see FIG. 8).

Prior art bread machines typically utilize a turn-and-lock configuration for retaining the bread pan in the bread machine. However, because of the front loading capability of the present bread machines, it is desirable to eliminate the "turn-and-lock" bread pan coupler of the prior art devices. As is best illustrated in FIG. 15, the detent clip 162 forms a compression fit with the detents 116 on the bottom of the bread pan 90. Consequently, the bread pan 90 can be disengaged from the well 158 by applying a vertical force on the bread pan 90 greater than the compression force of the detent clip 162.

Figure 18:
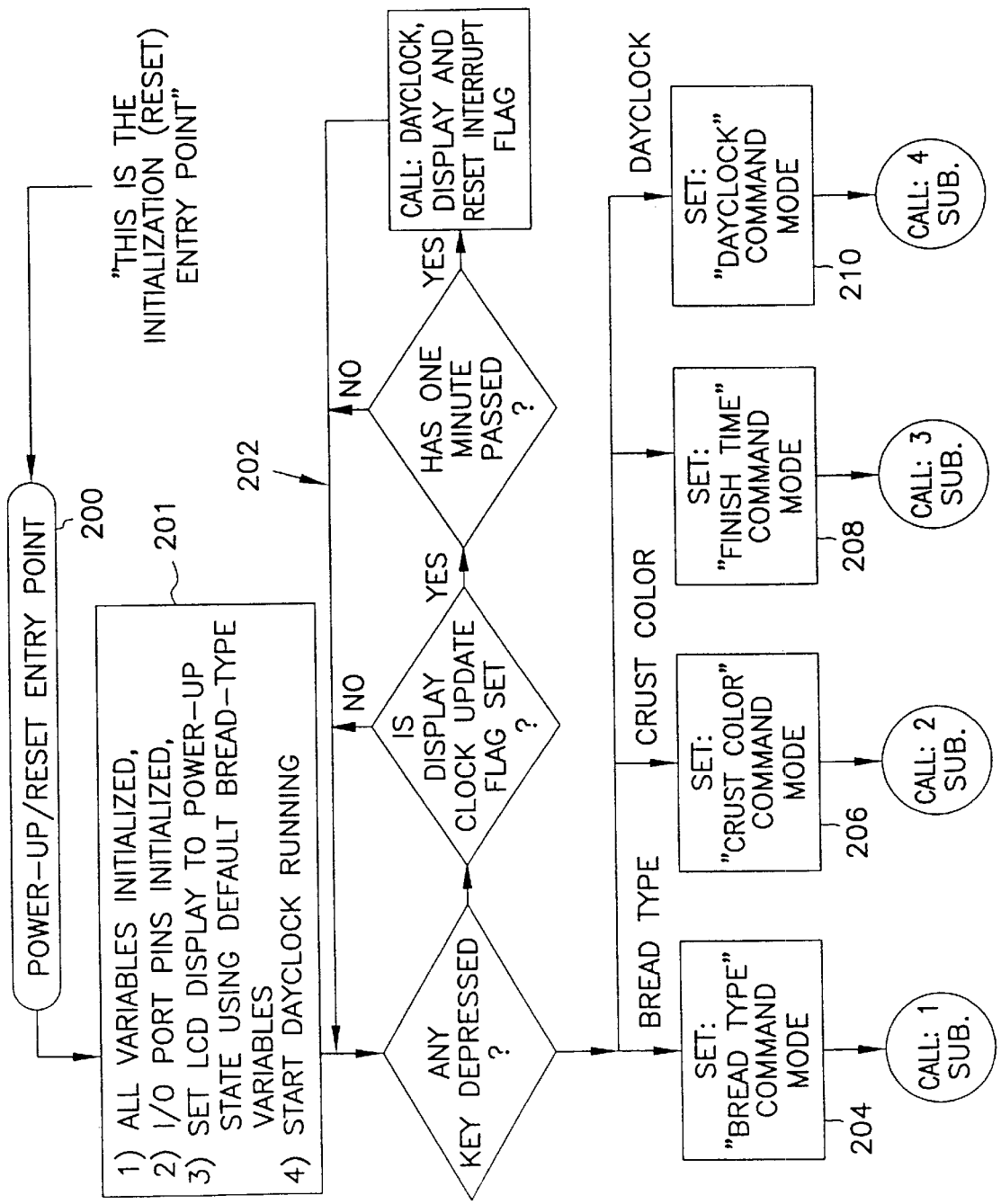
FIG. 18 is a flow chart illustrating a preferred method for programming a bread maker.

FIG. 18 is a flow chart illustrating the method for programming the bread makers. When the bread maker 30 is plugged-in at step 200, the control circuit 59 is initialized, the LCD is activated, and the default program settings are loaded 201. At steps 202, the control circuit 59 evaluates whether any of the function keys 53–57 have been depressed. At step 204, the BREAD TYPE button 55 calls the bread type subroutine (see FIG. 19). At step 206, the CRUST COLOR button 56 calls the crust color subroutine (see FIG. 20). At step 208, the FINISH TIME button 57 activates the finish time subroutine (see FIG. 21). At step 210, the CLOCK SET button 53 activates the DAY CLOCK subroutine (see FIG. 22).

Figure 19:
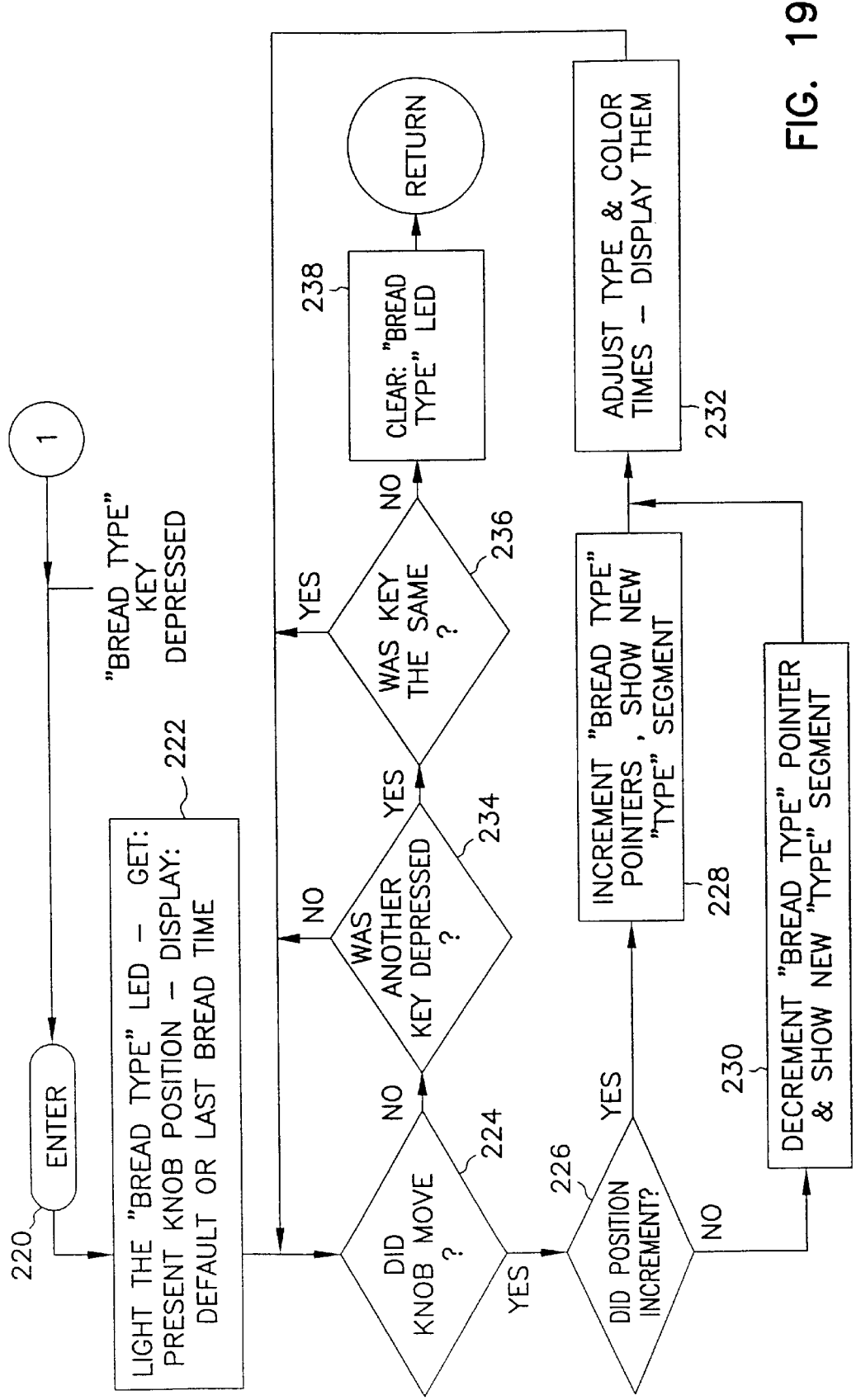
FIG. 19 is a flow chart of a preferred method for selecting a bread type for an automatic bread maker.

FIG. 19 illustrates a method for selecting the BREAD TYPE using the control panel 50 of the present bread machine 30. After the BREAD TYPE button 55 is depressed at step 220, the position of knob 68 is determined at step 222. The control circuit 59 evaluates at step 224 whether the knob 68 has been moved. At step 226, the control circuit 59 evaluates whether the knob 68 has been incremented or decremented. At step 228, the LCD 51 will display either a BREAD TYPE 190 or the BAKE only cycle setting selected by incrementing the knob 68. Correspondingly, at step 230, the LCD will display the BREAD TYPE 190 or BAKE only cycle selected by decrementing the knob 68. At step 232, the CRUST COLOR 196 and FINISH TIME 194 corresponding to the selected BREAD TYPE 190 is displayed. At step 234, the control circuit 59 evaluates whether another key was depressed. If the BREAD TYPE key is depressed again, step 236 returns the user to step 224. Otherwise, the control circuit 59 activates the LCD corresponding to the selected BREAD TYPE 190 or BAKE only cycle, and returns to step 202 in FIG. 18.

Figure 20:
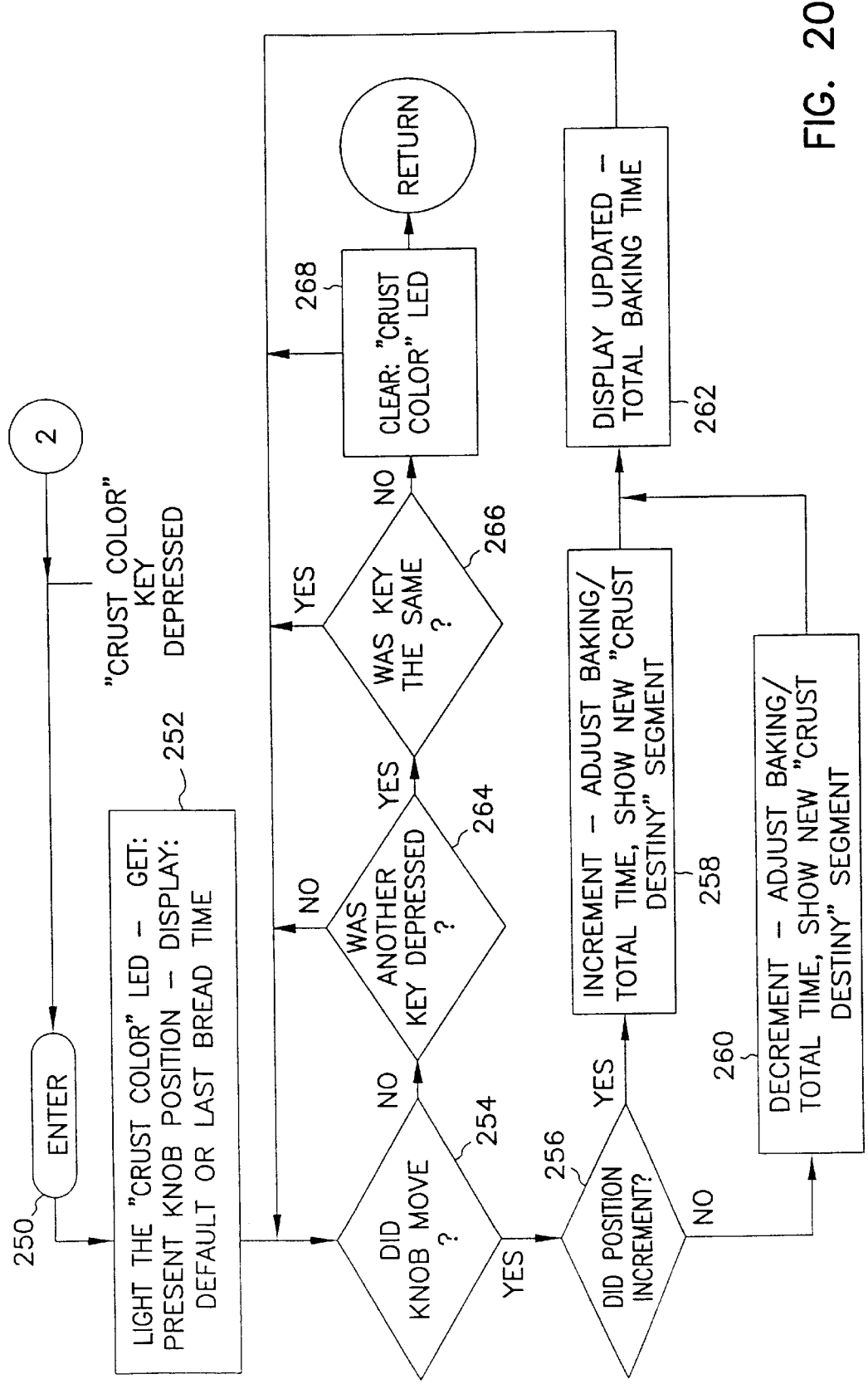
FIG. 20 is a flow chart of a preferred method for selecting the crust color for an automatic bread maker.

FIG. 20 illustrates a method for selecting the CRUST COLOR by depressing the CRUST COLOR key 56 at step 250. At step 252, the default crust color setting is displayed using crust color icon 196 (see FIG. 17). The default setting at step 252 is for none of the darkness bars of the bread icon 196 to be activated. At step 254, the control circuit 59 evaluates whether the knob 68 has been moved. At step 256, the control circuit 59 evaluates whether the knob 68 has been incremented 258 or decremented 260. After a CRUST COLOR is selected using knob 68, the total bake time 262 is adjusted as needed and the new finish time is displayed at clock 194. Each bar on the bread icon 196 corresponds to 5 additional minutes of bake time. At step 264 the control circuit 59 evaluates whether another key was depressed. If the CRUST COLOR key 56 is depressed again, step 266 returns the user to step 254. Alternatively, at step 268, the CRUST COLOR selection is displayed at the icon 196, and the user is returned to step 202 in FIG. 18.

Figure 21:
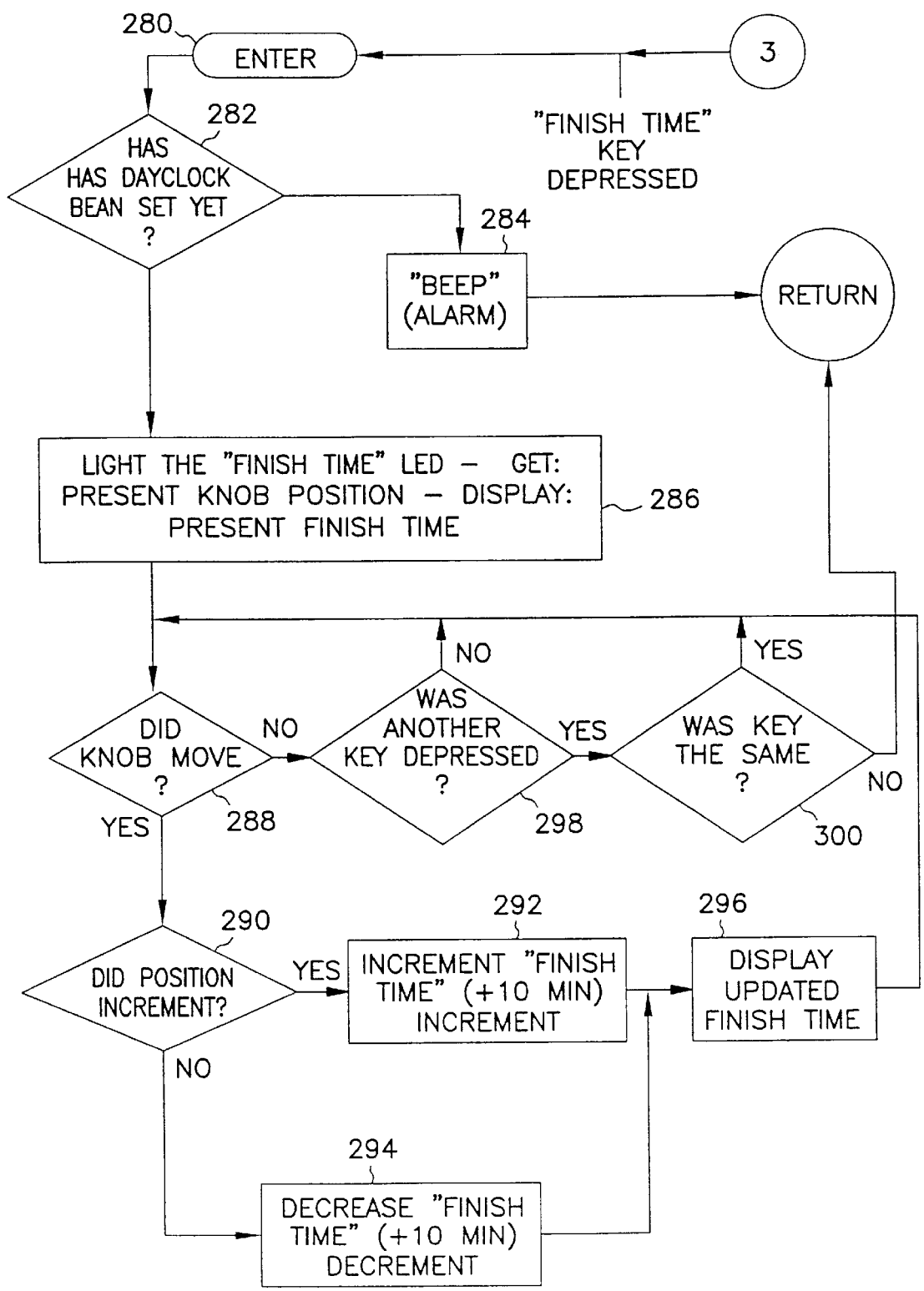
FIG. 21 is a flow chart for a preferred method for programming the finish time for an automatic bread maker.

FIG. 21 illustrates a method for programming the FINISH TIME by depressing the FINISH TIME key 57 at step 280. If the day clock has not been set at step 282, an alarm will sound at step 284 and the user will be returned to step 202. Alternatively, at step 286, the time of day when the bread will be completed corresponding to the previously selected BREAD TYPE 190 and CRUST COLOR 196 is displayed by the clock 194. At step 288, the control circuit 59 will determine whether the knob 68 has been moved. At step 290, the control circuit 59 evaluates whether the knob has been incremented 292 or decremented 294. The updated finish time is displayed at clock 194 at step 296. At step 298, the control circuit 59 evaluates whether another key has been depressed. If the FINISH TIME key 57 is depressed again, the control circuit 59 at step 300 will return the user to step 288. Alternatively, the user will be returned to step 202 in FIG. 18.

Figure 22:
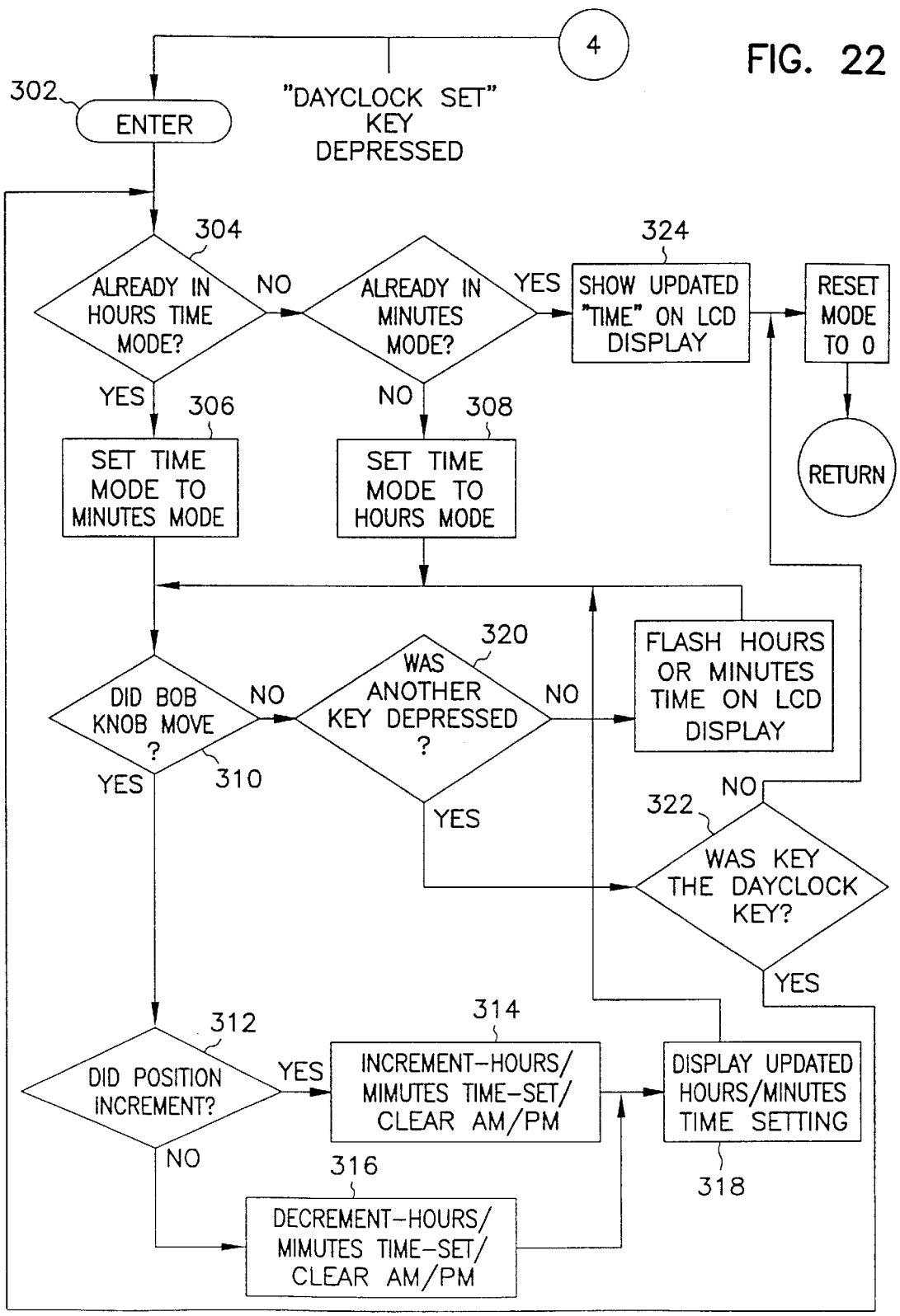
FIG. 22 is a preferred method for programming a day clock in an automatic bread maker.

FIG. 22 illustrates a method for setting the day clock of the present bread makers. The user presses the CLOCK SET button at step 302. At step 308 the hours portion of the clock 194 blink to signal the user to enter the correct hour of day. At step 310, the control circuit 59 evaluates whether the knob 68 has been turned. At step 312, the control circuit 59 evaluates whether the knob 68 has been incremented 314 or decremented 316. The hour of day according to the rotation of the knob 68 is displayed at step 318. At step 320, the control circuit 59 evaluates whether another button has been depressed again. At step 322, the control circuit 59 determines whether the CLOCK SET button was again depressed. If the CLOCK SET button is again depressed, the control circuit 59 returns the user to step 304. At step 306, the control circuit 59 changes the day clock to the minute mode and steps 310–318 are repeated to set the minutes. The updated time is displayed at step 324. At step 322, the control circuit 59 evaluates whether the CLOCK SET button has been pressed. If not, the reset mode returns the user to step 202 in FIG. 18.

Other modifications of the invention will be apparent to those skilled in the art in view of the foregoing descriptions. These descriptions are intended only to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

We claim:

1. A front-loading automatic bread maker for producing bread from bread ingredients, the bread maker comprising:
   a housing defining a mixing and cooking chamber, the housing having a top surface with a front portion, and a front surface with upper and lower portions, the housing having an opening extending along at least an intersection between the front portion of the top surface with the upper portion of the front surface;
   a cover movable between a closed position for substantially enclosing the mixing and cooking chamber and an open position proximate the lower portion of the front surface;
   at least one bread pan releasably retained in the mixing and cooking chamber for receiving the bread ingredients, the at least one bread pan having a rotatable kneading blade disposed therein for kneading the bread ingredients, and wherein the at least one bread pan comprises a plurality of connected sidewalls and a top opening, the sidewalls and opening comprising:
      an end wall;
      a bowed sidewall having an outward bow generally parallel to a longitudinal axis;
      a pair of opposing side walls generally parallel to the longitudinal axis, each of the opposing side walls having opposing internal ribs proximate the bowed sidewall, the ribs extending substantially the length of the opposing side walls and generally parallel to the longitudinal axis to form kneading surfaces, and to emulate, in cross section, the location of an overrise on the sides of a conventional slice of bread;
      a generally planar side wall connected to the end wall opposite the bowed side wall so that the cross sectional area thus defined emulates the bottom, sides and overrise of a conventional slice of bread; and
      an opening opposite the end wall for receiving the bread ingredients and for removal of the bread;
   a motor operatively connected to the kneading blade for kneading the bread ingredients;
   a heating element in the mixing and cooking chamber for baking the bread ingredients; and
   control means for controlling the operation of the motor and heating element according to a bread making cycle.

2. The apparatus of claim 1 wherein the bread pan further includes a bread maker engaging structure.

3. The apparatus of claim 1 wherein the ribs form grooves on outside surfaces of the pair of opposite side walls to form gripping surfaces to aid in handling the bread pan.

4. The apparatus of claim 1 wherein dimensions of a cross section of the bread pan are substantially the same as conventional sliced bread, so that bread made in the pan and sliced along planes perpendicular to the ribs will fit containers and appliances designed for conventional sliced bread.

5. A bread pan according to claim 1 wherein a ratio of a bread pan surface area to a surface area of the opening is greater than 6.5.

6. A bread pan according to claim 1 wherein a ratio of a bread pan surface area to a surface area of the opening is greater than 7.0.

7. The apparatus of claim 1 wherein the bread pan is composed from a material selected from the group consisting of aluminum, glass, and ceramic.

8. A front-loading automatic bread maker for producing bread from bread ingredients, the bread maker comprising:
   a housing defining a mixing and cooking chamber, the housing having a top surface with a front portion, and a front surface with upper and lower portions, the housing having an opening extending along at least an intersection between the front portion of the top surface with the upper portion of the front surface;
   a cover movable between a closed position for substantially enclosing the mixing and cooking chamber and an open position proximate the lower portion of the front surface;
   at least one bread pan releasably retained in the mixing and cooking chamber for receiving the bread ingredients, the at least one bread pan having a rotatable kneading blade disposed therein for kneading the bread ingredients;
   a motor operatively connected to the kneading blade for kneading the bread ingredients;
   a heating element in the mixing and cooking chamber for baking the bread ingredients;
   control means for controlling the operation of the motor and heating element according to a bread making cycle; and
   a user interface for controlling the motor and heating element comprising:
      a digital display;
      at least one button for activating at least one programming mode; and
      an input device for modifying individual parameters in the at least one program mode.

9. The apparatus of claim 8 wherein the at least one programming mode comprises bread type.

10. The apparatus of claim 8 wherein the at least one programming mode comprises crust color.

11. The apparatus of claim 8 wherein the at least one programming mode comprises finish time.

12. The apparatus of claim 8 wherein the input device is a rotary dial.

13. The apparatus of claim 8 wherein the input device is a joy stick.

14. A two-loaf, front-loading automatic bread maker for producing bread from bread ingredients, the bread maker comprising:

a housing defining a mixing and cooking chamber, the housing having a left side, a right side, a top surface with a front portion, and a front surface with upper and lower portions, the housing having an opening extending along an intersection between the front portion of the top surface with the upper portion of the front surface;

a cover engaged to the housing proximate the lower portion of the front surface, the cover moving between a closed position for substantially enclosing the mixing and cooking chamber and an open position proximate the lower portion of the front surface;

first and second bread pans releasably retained in the mixing and cooking chamber adjacent to the left and right sides, respectively, for receiving the bread ingredients, the bread pans having a rotatable kneading blades disposed therein for kneading the bread ingredients;

a motor operatively connected to the kneading blades for kneading the bread ingredients;

a heating element in the mixing and cooking chamber for baking the bread ingredients;

control means for controlling the operation of the motor and heating element according to a bread making cycle; and a user interface operatively connected to the control means, the user interface being attached to the housing proximate the lower portion of the front surface, and wherein the user interface is oriented at an angle between 30° and 60° degrees relative to horizontal.

15. A two-loaf, front-loading automatic bread maker for producing bread from bread ingredients, the bread maker comprising:

a housing defining a mixing and cooking chamber, the housing having a left side, a right side, a top surface with a front portion, and a front surface with upper and lower portions, the housing having an opening extending along an intersection between the front portion of the top surface with the upper portion of the front surface;

a cover engaged to the housing proximate the lower portion of the front surface, the cover moving between a closed position for substantially enclosing the mixing and cooking chamber and an open position proximate the lower portion of the front surface;

first and second bread pans releasably retained in the mixing and cooking chamber adjacent to the left and right sides, respectively, for receiving the bread ingredients, the bread pans having a rotatable kneading blades disposed therein for kneading the bread ingredients;

a motor operatively connected to the kneading blades for kneading the bread ingredients;

a heating element in the mixing and cooking chamber for baking the bread ingredients;

control means for controlling the operation of the motor and heating element according to a bread making cycle; and a user interface operatively connected to the control means, the user interface being attached to the housing proximate the lower portion of the front surface, and wherein the user interface comprises:
  a digital display;
  at least one button for activating at least one programming mode; and
  a rotating input device for modifying individual parameters in the at least one program mode.

16. A two-loaf, front-loading automatic bread maker for producing bread from bread ingredients, the bread maker comprising:

a housing defining a mixing and cooking chamber, the housing having a left side, a right side, a top surface with a front portion, and a front surface with upper and lower portions, the housing having an opening extending along an intersection between the front portion of the top surface with the upper portion of the front surface;

a cover engaged to the housing proximate the lower portion of the front surface, the cover moving between a closed position for substantially enclosing the mixing and cooking chamber and an open position proximate the lower portion of the front surface;

first and second bread pans releasably retained in the mixing and cooking chamber adjacent to the left and right sides, respectively, for receiving the bread ingredients, the bread pans having a rotatable kneading blades disposed therein for kneading the bread ingredients, wherein the kneading blades are operatively connected to fan pulleys having blade means for circulating air proximate the motor;

a motor operatively connected to the kneading blades for kneading the bread ingredients;

a heating element in the mixing and cooking chamber for baking the bread ingredients; and control means for controlling the operation of the motor and heating element according to a bread making cycle.

17. A front-loading automatic bread maker for producing bread from bread ingredients for use in a height restricted space, the space being defined by a support surface below and a height limiting surface above, the bread maker comprising:

a housing defining a mixing and cooking chamber, the housing having a bottom panel, a top surface with a front portion, and a front surface with upper and lower portions, the housing having an opening extending along an intersection between the front portion of the top surface with the upper portion of the front surface, a distance between the bottom panel and the top surface being less than a distance between the support surface and the height limiting surface;

a cover hinged to the housing proximate the upper portion of the front surface, the cover moving along an arc between a closed position for substantially enclosing the mixing and cooking chamber and an open position proximate the lower portion of the front surface, the arc traversing a path below the height limiting surface;

at least one bread pan in the mixing and cooking chamber for receiving the bread ingredients, the at least one bread pan having a rotatable kneading blade disposed therein for kneading the bread ingredients;

a motor operatively connected to the kneading blade for kneading the bread ingredients;

a heating element in the mixing and cooking chamber for baking the bread ingredients;

control means for controlling the operation of the motor and heating element according to a bread making cycle; and a user interface operatively connected to the control means, the user interface being attached to the housing proximate the lower portion of the front surface, and wherein the user interface is oriented at an angle between 30° and 60° degrees relative to the support surface.

18. A front-loading automatic bread maker for producing bread from bread ingredients, the bread maker comprising:

- a housing defining a mixing and cooking chamber, the housing having a top surface with a front portion, and a front surface with upper and lower portions, the housing having an opening extending along at least an intersection between the front portion of the top surface with the upper portion of the front surface;
- a cover movable between a closed position for substantially enclosing the mixing and cooking chamber and an open position proximate the lower portion of the front surface;
- at least one bread pan releasably retained in the mixing and cooking chamber for receiving the bread ingredients, the at least one bread pan having a rotatable kneading blade disposed therein for kneading the bread ingredients, and wherein the kneading blade is operatively connected to a fan pulley with blade means for circulating air proximate the motor;
- a motor operatively connected to the kneading blade for kneading the bread ingredients;
- a heating element in the mixing and cooking chamber for baking the bread ingredients; and
- control means for controlling the operation of the motor and heating element according to a bread making cycle.

19. A front-loading automatic bread maker for producing bread from bread ingredients, the bread maker comprising:

- a housing defining a mixing and cooking chamber, the housing having a top surface with a front portion, and a front surface with upper and lower portions, the housing having an opening extending along at least an intersection between the front portion of the top surface with the upper portion of the front surface;
- a cover movable between a closed position for substantially enclosing the mixing and cooking chamber and an open position proximate the lower portion of the front surface;
- at least one bread pan releasably retained in the mixing and cooking chamber for receiving the bread ingredients, the at least one bread pan having a rotatable kneading blade disposed therein for kneading the bread ingredients;
- a motor operatively connected to the kneading blade for kneading the bread ingredients;
- a heating element in the mixing and cooking chamber for baking the bread ingredients;
- control means for controlling the operation of the motor and heating element according to a bread making cycle; and
- a user interface operatively connected to the control means, the user interface being attached to the housing proximate the lower portion of the front surface, wherein the user interface is oriented at an angle between 30° and 60° degrees relative to horizontal.

* * * * *